US011457640B2

(12) United States Patent
Dancy et al.

(10) Patent No.: US 11,457,640 B2
(45) Date of Patent: Oct. 4, 2022

(54) SHRIMP PROCESSING EQUIPMENT HAVING DECAPITATION SYSTEM

(71) Applicant: GREGOR JONSSON INC., Lake Forest, IL (US)

(72) Inventors: Michael Dancy, Grayslake, IL (US); James Groff, Antioch, IL (US); Kevin Herrera, Grayslake, IL (US)

(73) Assignee: GREGOR JONSSON INC., Lake Forest, IL (US)

( * ) Notice: Subject to any disclaimer, the term of this patent is extended or adjusted under 35 U.S.C. 154(b) by 8 days.

(21) Appl. No.: 17/190,819

(22) Filed: Mar. 3, 2021

(65) Prior Publication Data

US 2021/0274796 A1   Sep. 9, 2021

Related U.S. Application Data

(60) Provisional application No. 63/116,567, filed on Nov. 20, 2020, provisional application No. 62/987,074, filed on Mar. 9, 2020.

(51) Int. Cl.
*A01K 29/00* (2006.01)
*A22C 29/02* (2006.01)

(52) U.S. Cl.
CPC .......... *A22C 29/028* (2013.01); *A22C 29/023* (2013.01)

(58) Field of Classification Search
CPC ..... A22C 29/02; A22C 29/022; A22C 29/023; A22C 29/028; A22C 29/026
USPC ........................................................ 452/1–5
See application file for complete search history.

(56) References Cited

U.S. PATENT DOCUMENTS

| | | | |
|---|---|---|---|
| 3,277,517 A * | 10/1966 | Jonsson | A22C 29/026 452/5 |
| 3,566,437 A | 3/1971 | Jonsson | |
| 3,698,038 A | 10/1972 | Jones, Jr. | |
| 3,751,766 A * | 8/1973 | Jonsson | A22C 29/026 452/5 |
| 4,385,422 A | 5/1983 | Ingalls et al. | |
| 4,472,858 A * | 9/1984 | Keith | A22C 29/02 452/150 |
| 4,507,825 A * | 4/1985 | Betts | A22C 29/02 452/2 |
| 4,745,660 A * | 5/1988 | Betts | A22C 29/026 452/5 |
| 4,769,871 A * | 9/1988 | Betts | A22C 29/022 452/5 |
| 4,912,810 A * | 4/1990 | Laughlin | A22C 29/026 452/8 |

(Continued)

FOREIGN PATENT DOCUMENTS

| CN | 206596597 U | 10/2017 |
|---|---|---|
| CN | 108029739 A | 5/2018 |

(Continued)

*Primary Examiner* — Richard T Price, Jr.
(74) *Attorney, Agent, or Firm* — Marshall, Gerstein & Borun LLP

(57) ABSTRACT

A shrimp processing machine includes a frame assembly and a processing assembly operably coupled with the frame assembly. The processing assembly includes a drive assembly, a clamp mechanism, and a decapitation system. The drive assembly is operably coupled with the frame assembly. The clamp mechanism is adapted to engage the shrimp. The decapitation system is adapted to separate the shrimp body from the shrimp head.

20 Claims, 32 Drawing Sheets

(56) References Cited

U.S. PATENT DOCUMENTS

| | | | |
|---|---|---|---|
| 4,934,028 A | | 6/1990 | Stipe |
| 5,405,287 A | | 4/1995 | Allain |
| 5,839,952 A | * | 11/1998 | Pollingue ............. A22C 29/028 |
| | | | 452/8 |
| 8,574,041 B1 | * | 11/2013 | Allain .................. A22C 29/028 |
| | | | 452/4 |
| 9,833,005 B1 | * | 12/2017 | Dancy .................. A22C 29/026 |
| 2021/0274796 A1 | | 9/2021 | Dancy et al. |

FOREIGN PATENT DOCUMENTS

| | | |
|---|---|---|
| CN | 207561315 U | 7/2018 |
| CN | 215898760 U | 2/2022 |
| ES | 2552102 A1 | 11/2015 |

* cited by examiner

SHRIMP PROCESSING EQUIPMENT HAVING DECAPITATION SYSTEM

CROSS REFERENCE TO RELATED APPLICATIONS

This application claims the benefit of U.S. Provisional Application No. 62/987,074, filed on Mar. 9, 2020, and U.S. Provisional Application No. 63/116,567, filed on Nov. 20, 2020, the entirety of each is herein expressly incorporated by reference.

FIELD OF THE DISCLOSURE

The present disclosure generally relates to a machine for processing shrimp having a head and a body and, more particularly, to a semi-automated machine for processing and separating the head from the body.

BACKGROUND

Historically, shrimp was processed by hand in preparation of consumer sale and consumption. More recently, various types of automated or semi-automated shrimp processing machines have been implemented in processing facilities which are capable of partially or completely removing a shell of a shrimp, thus readying shrimp meat for sale, cooking, and/or consumption. Some of these machines also have cutting capabilities which can cut the shrimp meat at desired locations. Such machines can reduce overall processing times and provide consistent processing results.

SUMMARY

In some embodiments of the present disclosure, a shrimp processing machine includes a frame assembly and a processing assembly operably coupled with the frame assembly. The Processing assembly includes a drive assembly, a clamp mechanism, and a meat picking member. The drive assembly is operably coupled with the frame assembly. The clamp mechanism is adapted to engage the shrimp. The decapitation system is adapted to separate the shrimp body from the shrimp head.

In some examples, the decapitation system may include a meat picking member being movable relative to the clamp mechanism, the meat picking member adapted to travel along a path to pierce the shrimp body and separate the shrimp body from the shrimp head.

In some examples, the processing assembly further includes a bracket member operably coupled with the drive assembly. The bracket member includes a shrimp support surface adapted to at least partially support at least one of the shrimp body or the shrimp head. In some examples, the bracket member includes a recessed region to accommodate a portion of the shrimp head.

In some approaches, the clamp mechanism may be operably coupled with the bracket member and may include at least one clamp pin to engage at least one of the shrimp body or the shrimp head. The clamp mechanism may be adapted to retain the shrimp head upon the meat picking member piercing the shrimp, thereby separating the shrimp body from the shrimp head upon continued movement of the meat picking member.

In some approaches, the meat picking member may be mounted to an oscillating arm that is operably coupled with the drive assembly. Further, in some examples, the meat picking member may include a picker arm having a piercing portion and a sliding portion. The sliding portion of the picker arm may slidably engage the shrimp and the piercing portion of the picker arm may pierce the shrimp body.

In any of these examples, the shrimp processing machine may additionally include an adjustable positioning roller assembly that includes a roller arm and a roller body. The adjustable positioning roller assembly may exert an urging force on the shrimp to position the shrimp on the bracket member.

In some examples, the shrimp processing machine may further include an adjustable guide member adapted to align the shrimp on the bracket member. The adjustable guide member may include a first guide member body and a second guide member body. The first guide member body may include a first guide fork extending therefrom and the second guide member body may include a second guide fork extending therefrom. The first and the second guide members are operably coupled with each other. The first and the second guide forks cooperate to center the shrimp on the bracket member. In some of these examples, the adjustable guide member may further include a resilient member operably coupled with the first guide member body and the second guide member body to exert an urging force on the first guide fork and the second guide fork.

In some of these examples, the adjustable guide member is in the form of a strut operably coupled with the frame assembly, a mounting shaft operably coupled with the strut, a first mount disk, and a second mount disk. Each of the first and second mount disks are movably coupled with the mounting shaft and cooperate to center the shrimp on the bracket member.

In some examples, the shrimp processing machine may further include a cutting device operably coupled with the drive assembly to cut the shrimp. The cutting device may be movably adjustable relative to the bracket member.

In some examples, the decapitation system may include a mounting member, a blade movably coupled with the mounting member, and a decapitation drive assembly operably coupled with the blade assembly. The blade assembly includes a blade being movable between a raised position and a lowered position. The decapitation drive assembly includes a gear and a cam member operably coupled with the gear. The gear is adapted to engage a main gear of the shrimp processing machine. The cam member is movably coupled with a portion of the blade assembly to urge the blade between the raised and lowered positions.

In accordance with a second embodiment, a decapitation system for a shrimp processing machine includes a mounting member, a blade movably coupled with the mounting member, and a decapitation drive assembly operably coupled with the blade assembly. The blade assembly includes a blade being movable between a raised position and a lowered position. The decapitation drive assembly includes a gear and a cam member operably coupled with the gear. The gear is adapted to engage a main gear of the shrimp processing machine. The cam member is movably coupled with a portion of the blade assembly to urge the blade between the raised and lowered positions.

In some of these examples, the blade assembly includes an elongated track operably coupled with the mounting member. The blade is movable within the track. Further, in some examples, the blade assembly may include a roller operably coupled with the blade. The roller may include a cam engagement portion adapted to engage the cam member. In some approaches, the cam member includes a helical body defining a cam face adapted to engage the cam engagement portion of the roller.

In some examples, the blade assembly includes a resilient member adapted to bias the blade towards the lowered position. The blade may include an elongated member having a first end including a beveled surface and a second end. The first end of the blade may further include a blade tip extending from the beveled surface. In some approaches, the mounting member includes a mounting plate having at least one mounting region to secure with a frame assembly of the shrimp processing machine.

BRIEF DESCRIPTION OF THE DRAWINGS

The above needs are at least partially met through provision of the shrimp processing device described in the following detailed description, particularly when studied in conjunction with the drawings, wherein.

Figure 1:
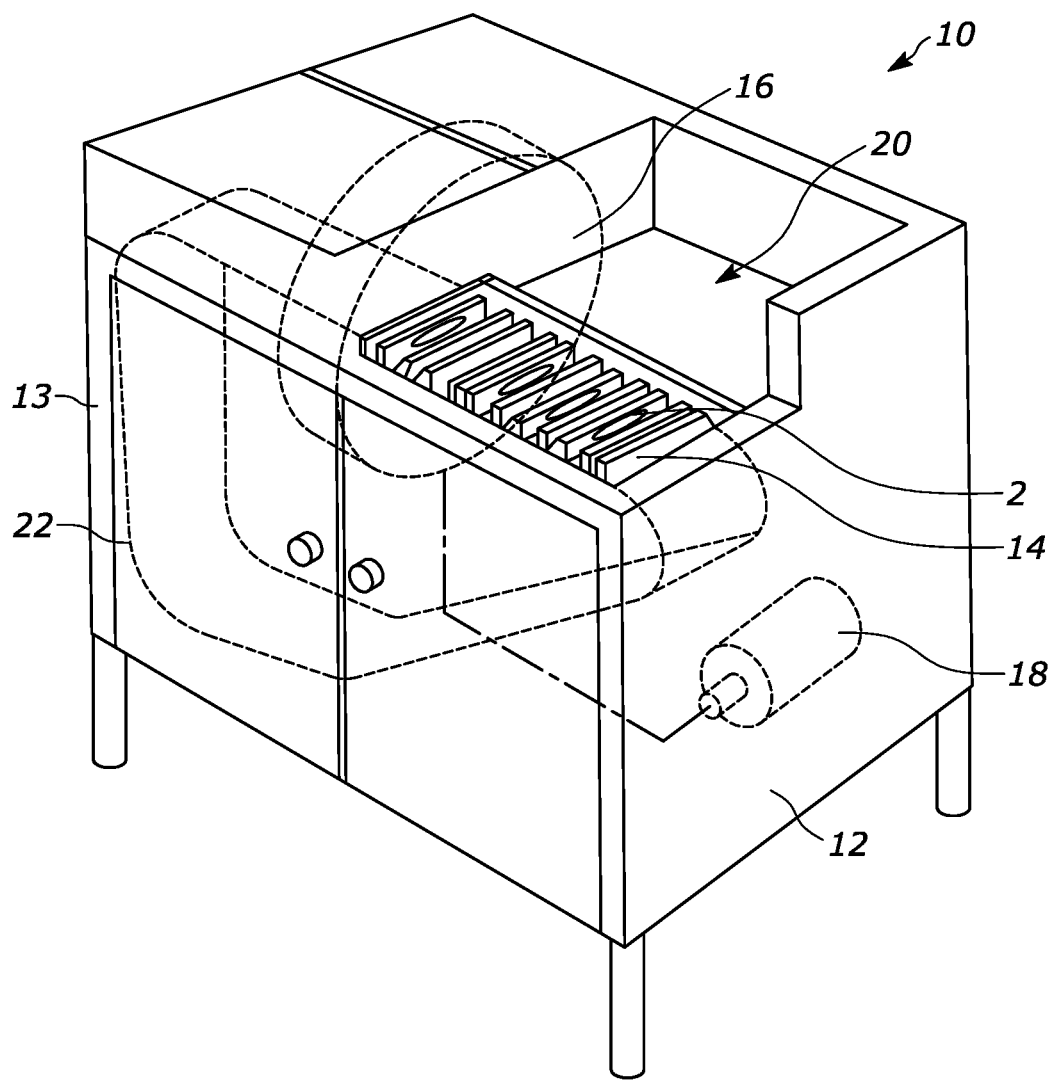
FIG. 1 illustrates a perspective schematic view of an example shrimp processing machine in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, the present disclosure is directed to an at least semi-automatic shrimp processing machine that is capable of adjustably cutting and picking shrimp. More specifically, the shrimp processing machine is capable of decapitating the shrimp—that is, the machine is capable of separating the body of the shrimp from the head of the shrimp. As a result, processing times may be greatly reduced as compared to previously existing machines lacking this capability that require manual decapitation. In some examples, the decapitation system may be provided as a retrofit accessory that may be mounted to existing shrimp processing machines. In other examples, the shrimp processing machine may come equipped with the decapitation system installed thereon prior to delivery. The machine may additionally include any number of adjustable components to selectively cut and process shrimp of varying sizes. An operator may quickly engage the adjustable components to quickly select desired processing settings.

Referring now to the drawings, a shrimp processing machine 10 is constructed in accordance with various embodiments of the present disclosure. The general construction and operation of the machine 10 can be similar to any one or ones of the machines disclosed in the commonly-owned U.S. Pat. No. 2,850,761, filed on May 3, 1956, U.S. Pat. No. 3,214,789, filed on Jan. 28, 1963, U.S. Pat. No. 3,238,561, filed on Mar. 8, 1966, U.S. Pat. No. 3,247,542, filed on Apr. 26, 1966, U.S. Pat. No. 6,533,651, filed on Mar. 27, 2001, U.S. Pat. No. 6,485,363, filed on Mar. 27, 2001, U.S. Pat. No. 7,867,067, filed on Mar. 12, 2009, and U.S. Pat. No. 9,833,005, filed on Jan. 9, 2017, U.S. Patent Application No 62/987,074, filed on Mar. 9, 2020, and U.S. patent application Ser. No. 16/859,495, filed on Apr. 27, 2020, the entire contents of each are expressly incorporated herein by reference.

Figure 2:
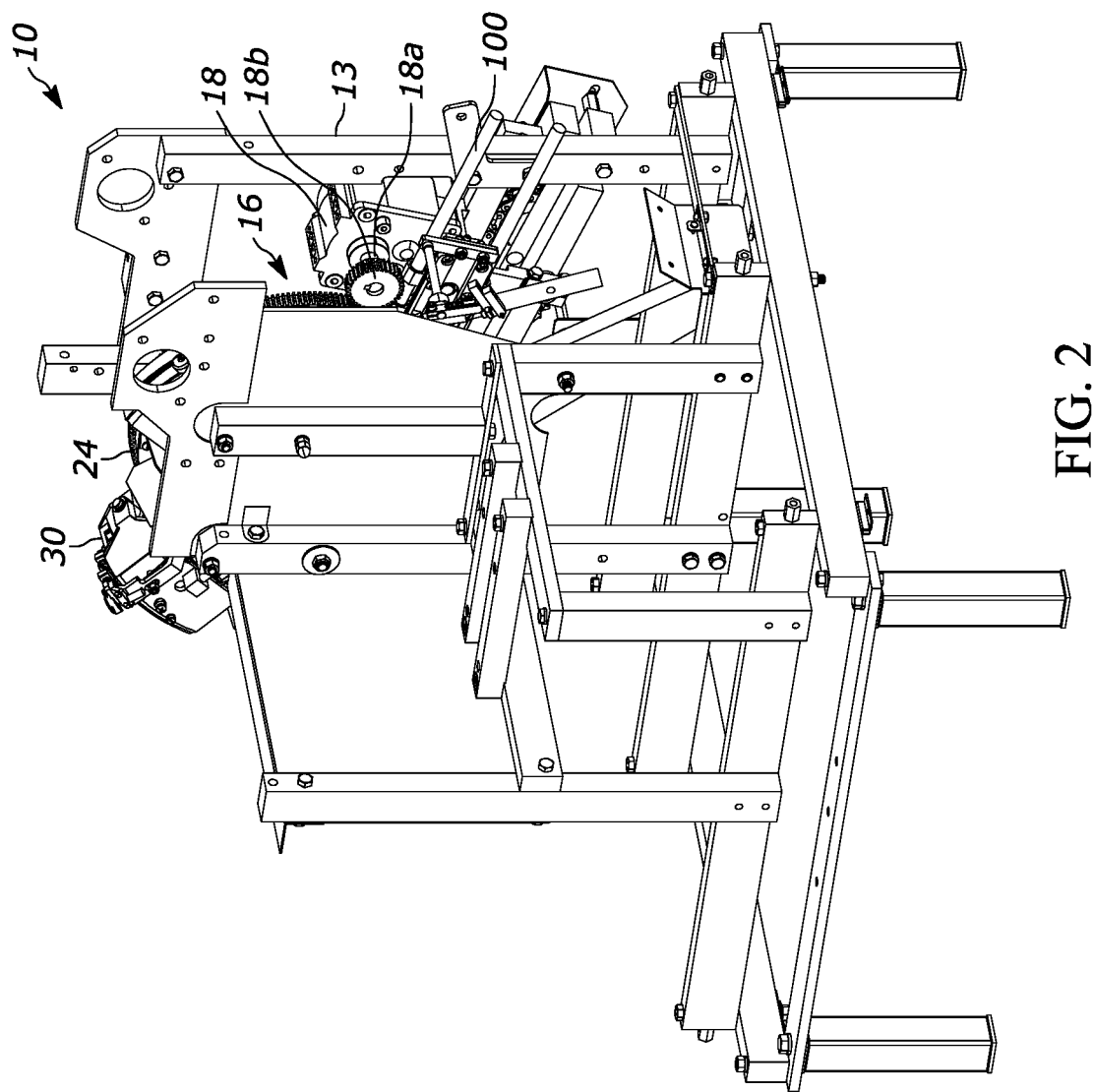
FIG. 2 illustrates a perspective view of the example shrimp processing machine of FIG. 1 having a protective covering removed in accordance with various embodiments.
Figure 3:
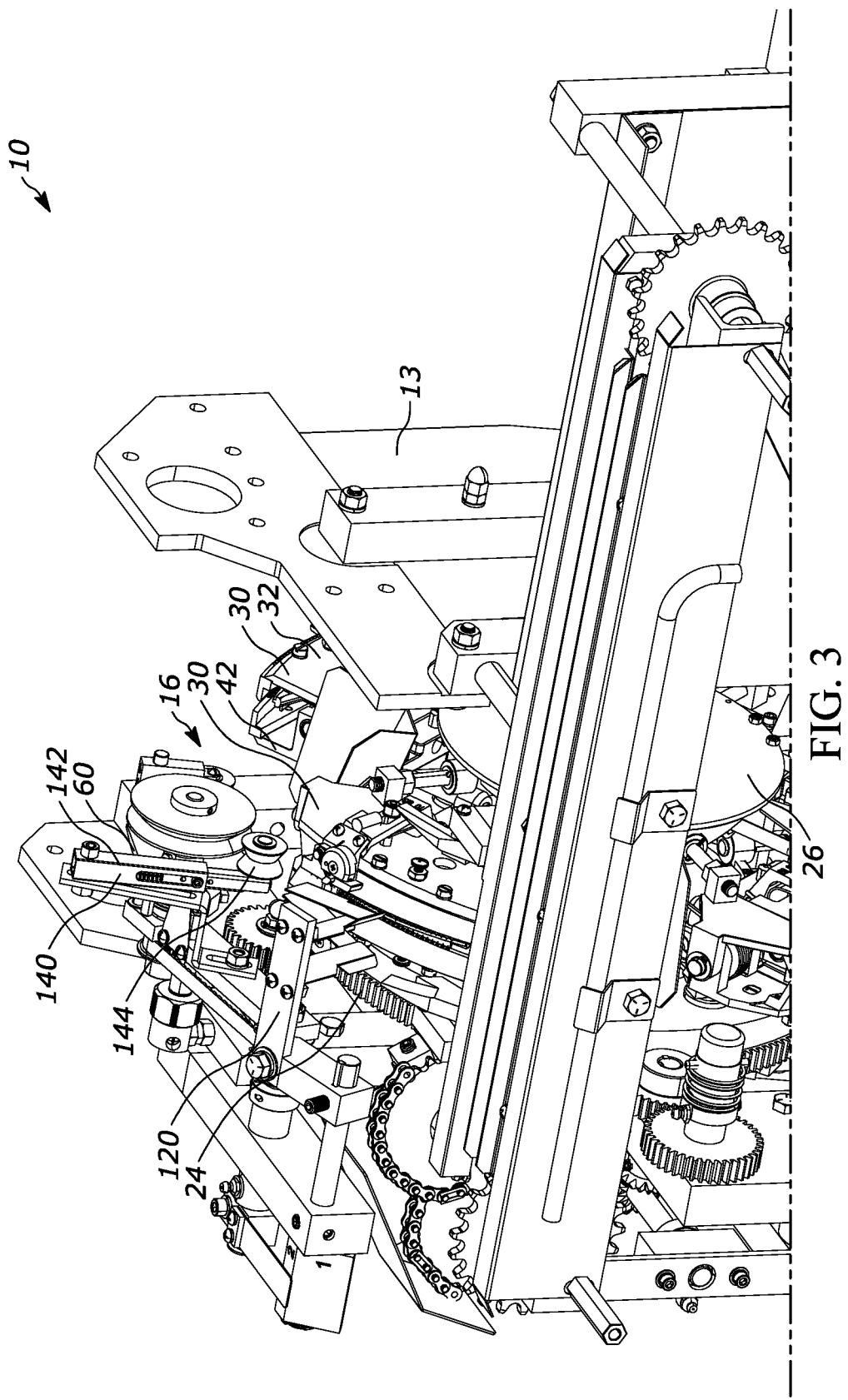
FIG. 3 illustrates a front perspective view of the example shrimp processing machine of FIGS. 1 and 2 having an example processing assembly in accordance with various embodiments.

More specifically, the shrimp processing machine 10 includes a housing 12, a frame assembly 13, a number of individual loading trays 14, and a processing assembly 16 operably coupled with the frame assembly 13. Further, the shrimp processing machine 10 includes a motor 18 coupled with a motor gear axle 18a (FIG. 2). The housing 12 defines a hopper 20 for receiving unprocessed shrimp 2. The individual loading trays 14 are positioned on a conveyor 22 and move adjacent to the hopper 20. The motor 18 actuates the conveyor 22 and the processing assembly 16 such that during operation, shrimp carried on the loading trays are delivered to the processing assembly 16 for processing.

The processing assembly 16 includes a drive assembly 24 in the form of a main gear, any number of individual shrimp clamp mechanisms 30 (e.g., between two and eight shrimp clamp assemblies 30), an adjustable guide member 120, an adjustable positioning roller assembly 140, and any number of work stations used to process the shrimp 2. The drive assembly 24 is operably coupled with the frame assembly 13 via any number of support members, brackets, arms, and the like. The processing assembly 16 includes an adjustable meat picking member 160 as well as any number of additional work stations such as an adjustable cutter assembly, a cleaning station, a deveining station, and the like, each of which may be disposed around the main gear 24.

Figure 4:
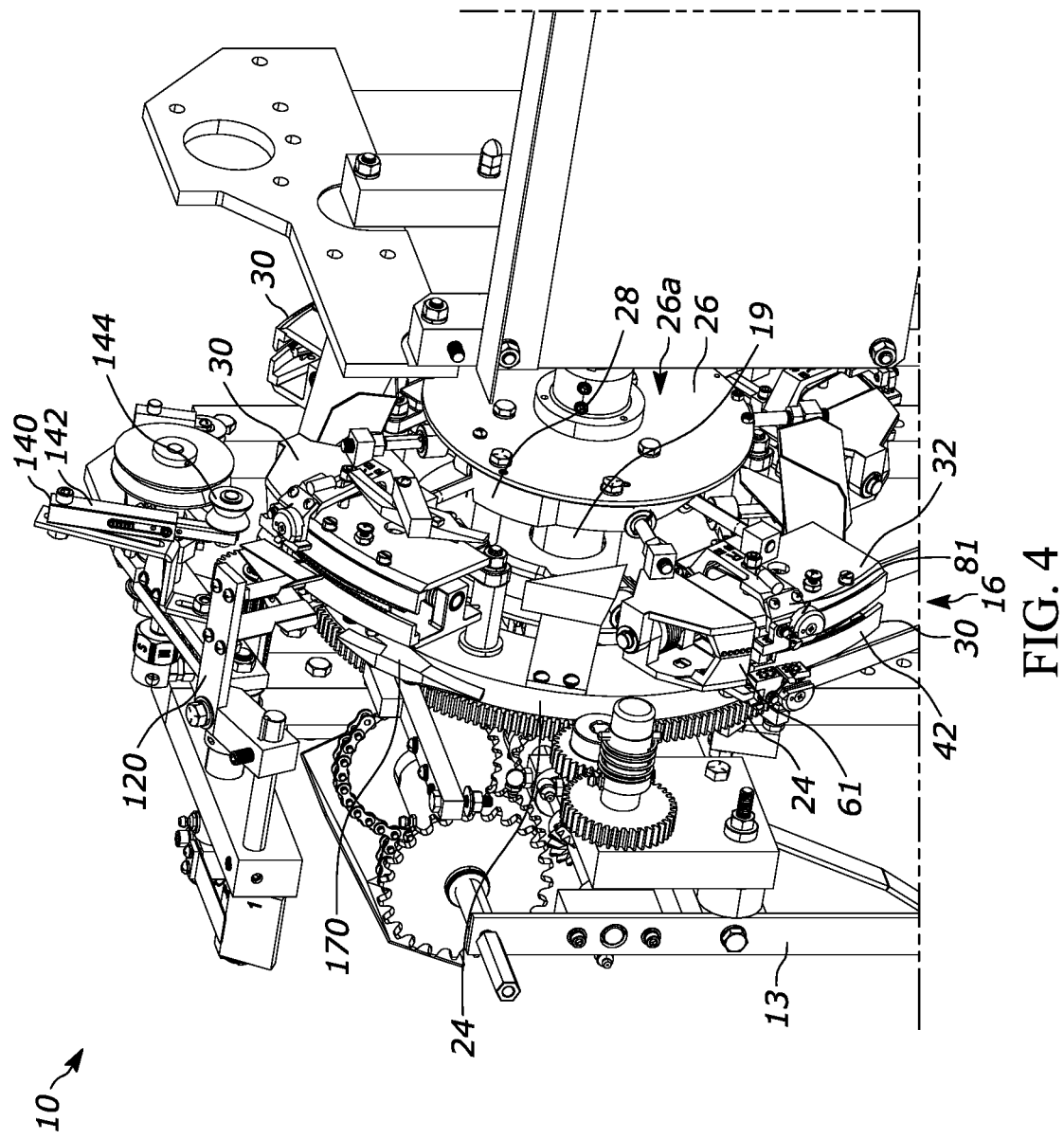
FIG. 4 illustrates a front perspective view of the example processing assembly in accordance with various embodiments.
Figure 5:
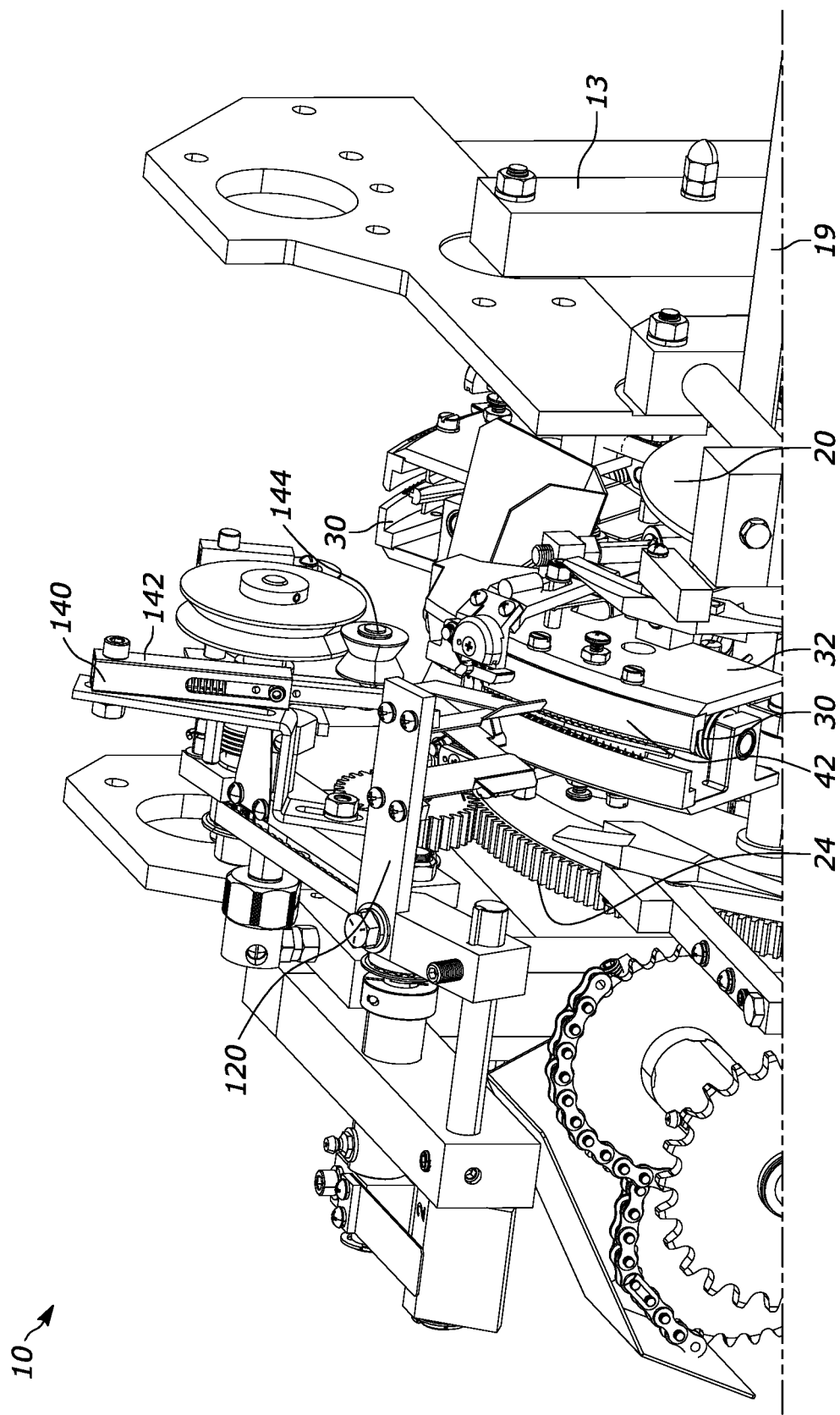
FIG. 5 illustrates a close-up front perspective view of the example processing assembly of FIGS. 3 and 4 in accordance with various embodiments.
Figure 6:
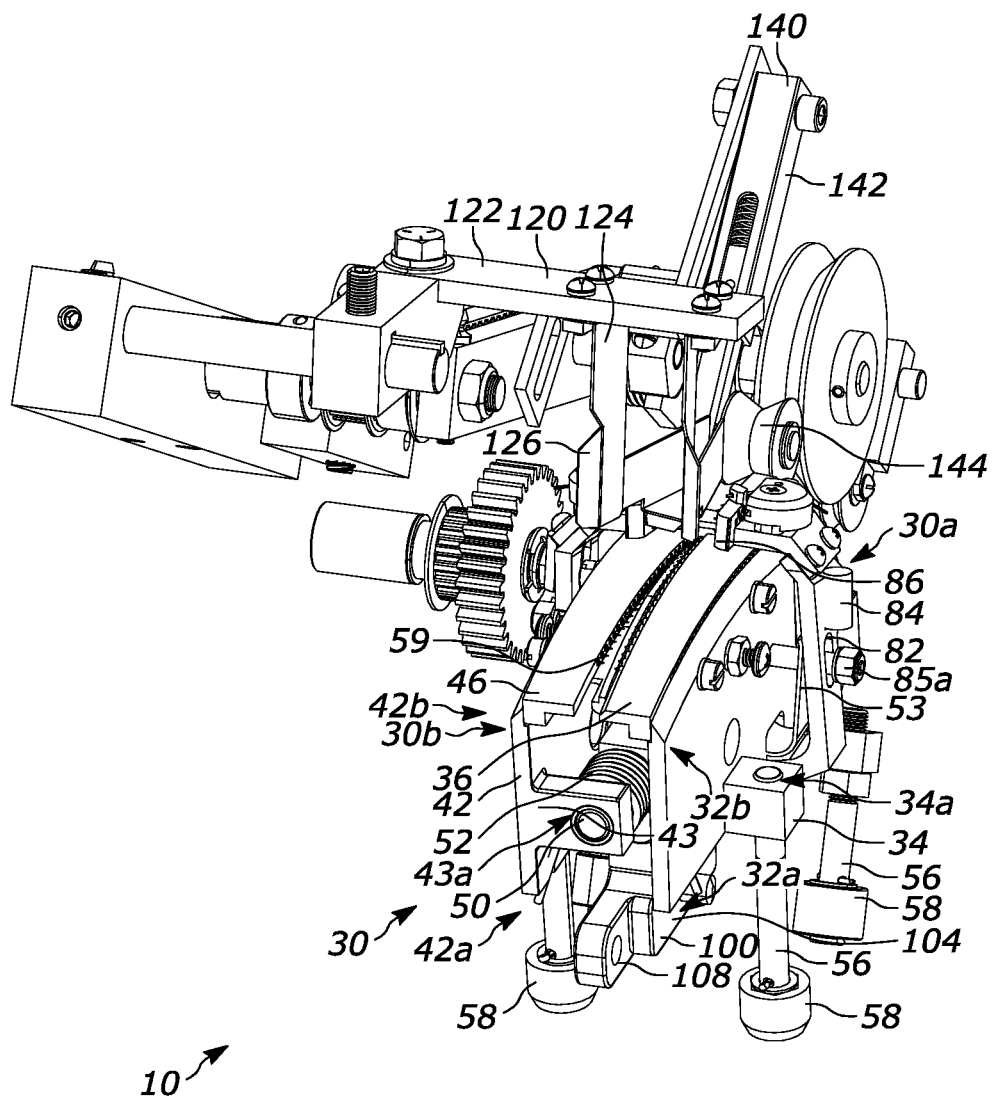
FIG. 6 illustrates a perspective view of the example processing assembly of FIGS. 3-5 in accordance with various embodiments.
Figure 7:
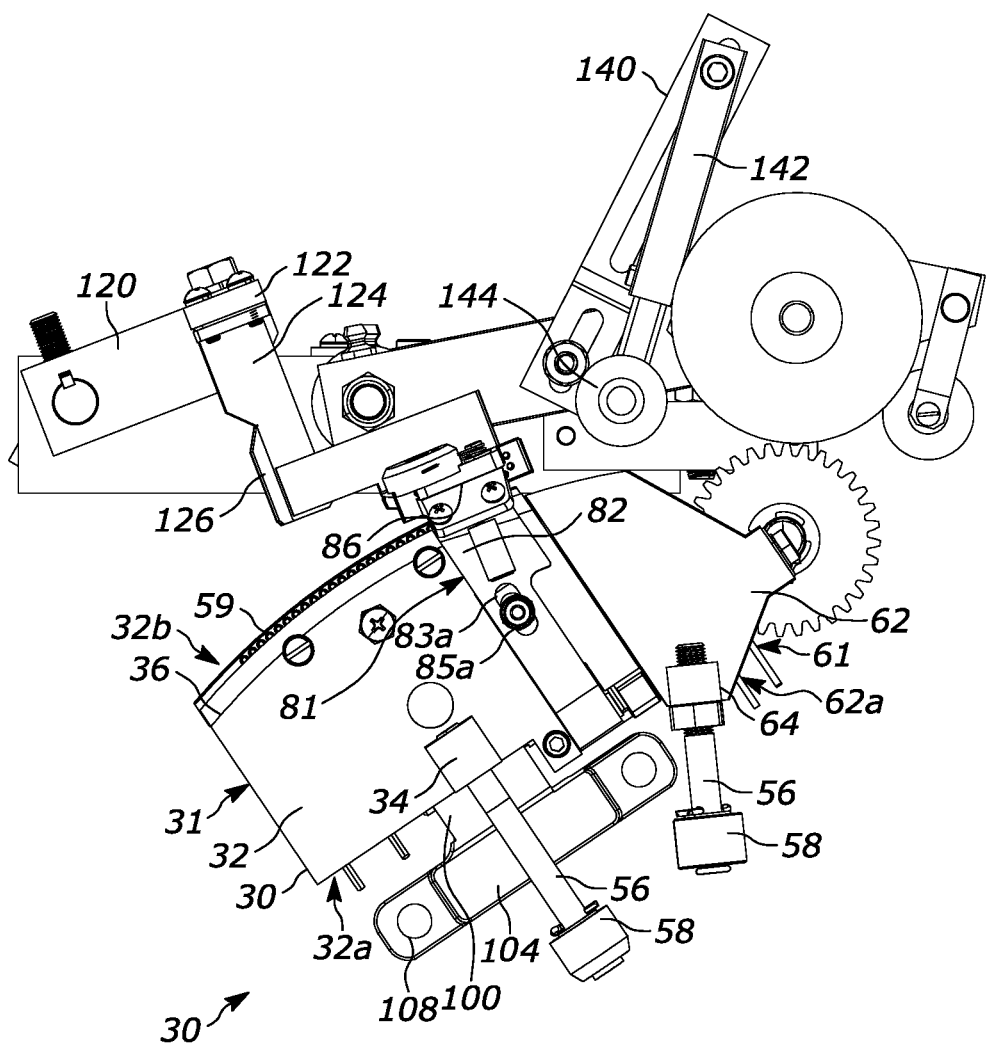
FIG. 7 illustrates a side elevation view of the example processing assembly of FIGS. 3-6 in accordance with various embodiments.
Figure 8:
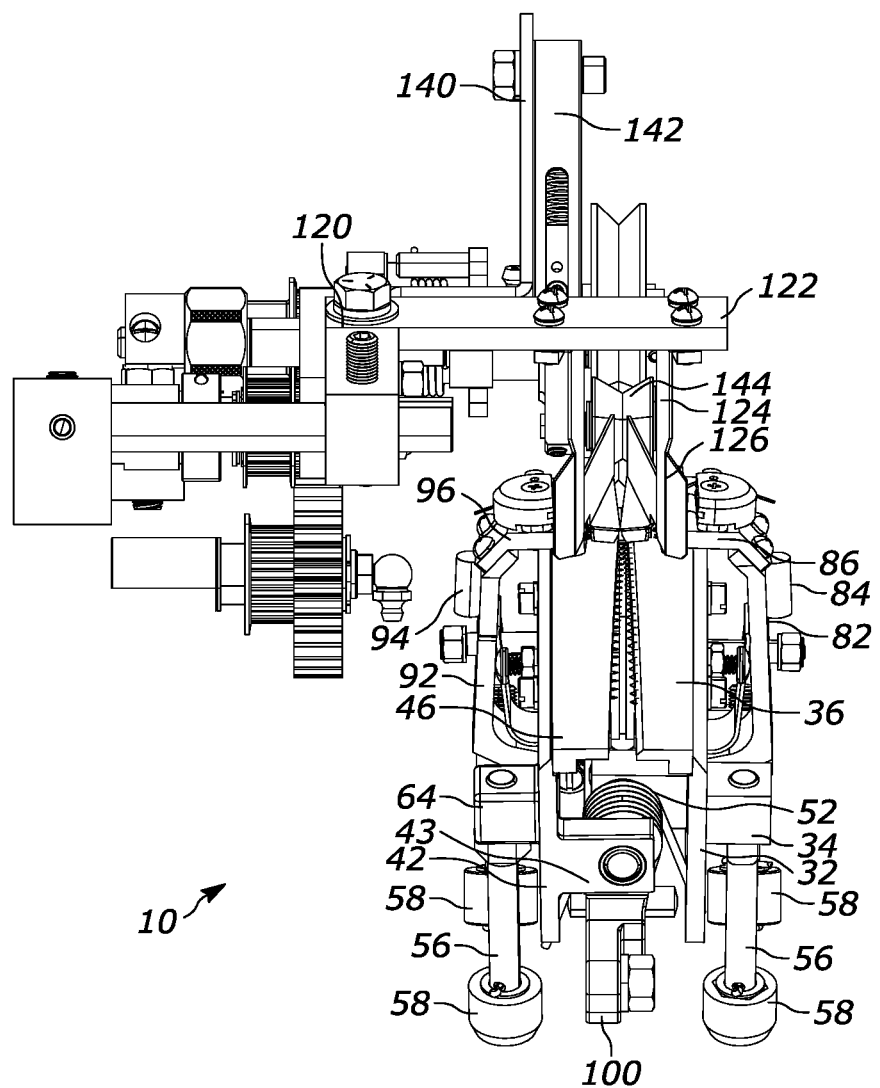
FIG. 8 illustrates a rear elevation view of the example processing assembly of FIGS. 3-7 in accordance with various embodiments.
Figure 9:
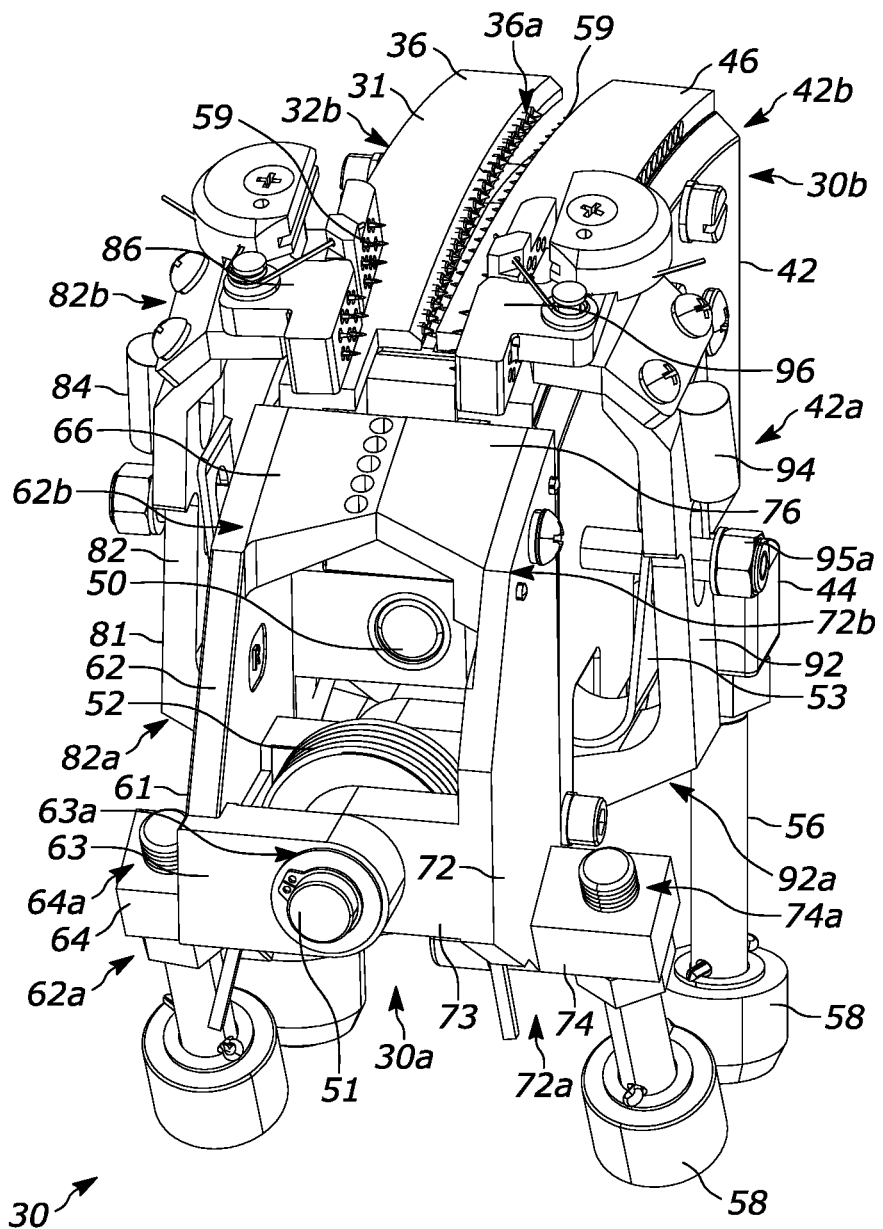
FIG. 9 illustrates a front perspective view of an example clamp mechanism for use with the example processing assembly of FIGS. 3-8 in accordance with various embodiments.
Figure 10:
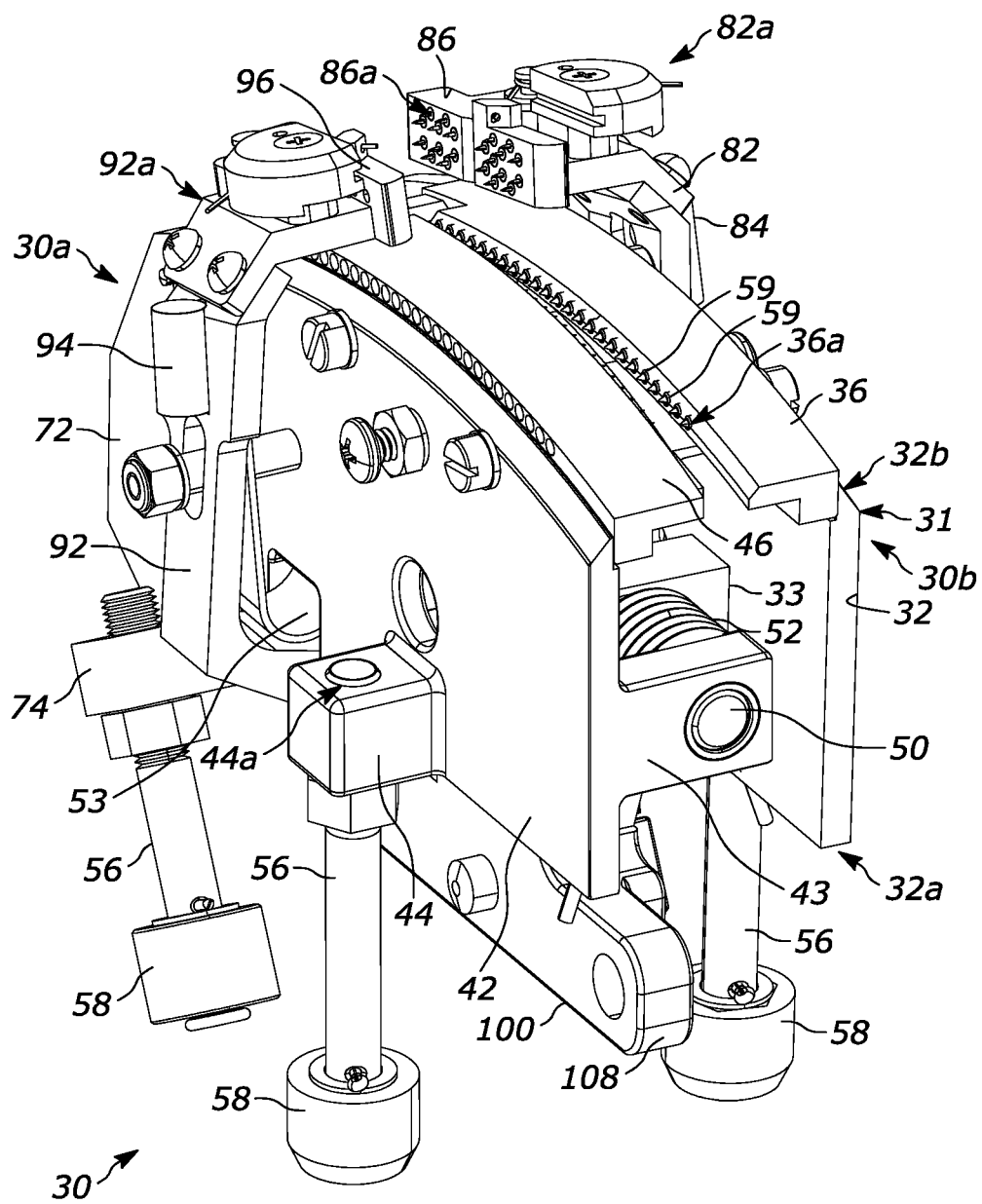
FIG. 10 illustrates a rear perspective view of the example clamp mechanism of FIG. 9 in accordance with various embodiments.

As illustrated in FIG. 2, the motor 18 is operably coupled with a motor gear 18b via the main gear axle 18a, which is operably coupled with the main gear 24 such that it is driven by the motor 18. During operation, the motor 18 drives the motor gear 18a, and thus the main gear 24, thereby causing it to move in a rotational direction. The main gear 24 is coupled with and/or supported by a main gear axle 19 (FIG. 4).

As the main gear 24 rotates, the shrimp clamp mechanisms 30 pass from beneath the loading trays 14. As each clamp mechanism 30 passes a tray 14, the clamp mechanism 30 grasps the shrimp 2. With the shrimp 2 retained by the clamp mechanism 30, continued rotation of the main gear 24 moves the shrimp 2 toward the work stations (i.e., the adjustable meat picking member 160 and any other work stations) for processing.

The shrimp processing machine 10 includes any number of drive cams 26 which may also be operably coupled with the main gear axle 19. More specifically, the drive cam 26 defines an opening 26a through which the main gear axle 19 is inserted. This configuration allows the main gear axle 19 to rotate within the opening 26a of the drive cam 26 while the drive cam 26 remains stationary. The drive cam 26 includes any number of engagement regions 28 in the form of protruding surfaces that extend outwardly from the body of the drive cam 26.

With particular reference to FIGS. 6-19, the clamp mechanism 30 has a first end 30a and a second end 30b and includes a main clamp 31, a small clamp assembly 61, and a tail breaker assembly 81. The main clamp 31 includes a first side plate 32 and a second side plate 42. In the illustrated example, the first and second side plates 32, 42 each includes a lower portion 32a, 42a, respectively, an upper portion 32b, 42b, respectively, at least one support flange 33, 43, respectively, having an opening 33a, 43a that accommodates a clamp rod 50. So configured, the first and second side plates 32, 42 are each rotatable relative to the clamp rod 50. Further, each of the first and second side plates 32, 42 includes a drive arm mounting member 34, 44 positioned at or near the lower portion 32a, 42a thereof that includes a bore 34a, 44a to receive a drive arm 56 coupled with a bumper 58.

The clamp mechanism 30 further includes a number of resilient members in the form of torsion springs 52 that are dimensioned to be disposed around and/or operably coupled with the clamp rod 50. In the illustrated example, the torsion spring 52 includes a spring body 52a and a number of engaging arms 52b that extend outwardly from the spring body 52a to engage the lower portions 32a, 42a of the first and second side plates 32, 42. As a result of this urging by the engaging arms 52b, the lower portions 32a, 42a of the first and second side plates 32, 42 are urged outwardly such that the first and second side plates 32, 42 pivot about the clamp rod 50, thereby causing the upper portions 32b, 42b to move inwardly towards each other in a clamping motion.

Each of the first and second side plates 32, 42 includes a clamping surface or portion 36, 46 positioned at or near the upper portion 32b, 42b thereof. More specifically, the clamping portions 36, 46 extend along a length (e.g., all or substantially all) of the upper portions 32b, 42b of the first and second side plates 32, 42 and face "inwardly" towards each other. In the illustrated examples, the clamping portions 36, 46 are in the form of distinct bracket members that are coupled with the first and second side plates 32, 42, but in other examples, the clamping portions 36, 46 may be integrally formed therewith. The clamping portions 36, 46 include any number of holes 36a, 46a to receive clamp pins 59 that are in the form of conical members. In the illustrated examples, the clamping portions 36, 46 include holes 36a, 46a that extend across all or substantially all of the length of the clamping portions 36, 46 to receive clamp pins 59. Such a configuration advantageously provides for increased contact with the shrimp 2 at both the body and the head regions, resulting in a more secure retention of the shrimp 2. In other examples, the clamp pins 59 may be in the form of different shapes. Further, in some examples, the clamp pins 59 may be formed integrally with the clamping portions 36, 46.

The small clamp assembly 61 includes a first end plate 62 and a second end plate 72 positioned at the first end 30a of the clamp mechanism 30. The first and second end plates 62, 72 include similar features as the first and second side plates 32, 42. In the illustrated example, the first and second end plates 62, 72 each include a lower portion 62a, 72a, respectively, an upper portion 62, 72b, respectively, at least one support flange 63, 73, respectively, having an opening 63a, 73a that accommodates a second clamp rod 51. So configured, the first and second end plates 62, 72 are each rotatable relative to the clamp rod 51. Further, each of the first and second end plates 62, 72 includes a drive arm mounting member 64, 74 positioned at or near the lower portion 62a, 72a thereof that includes a bore 64a, 74a to receive additional drive arms 56 coupled with respective bumpers 58.

Any number of the previously described torsion springs 52 may be disposed on and/or operably coupled with the clamp rod 51 to engage the first and second end plates 62, 72. As a result of this urging by the engaging arms 52b of the torsion spring or springs 52, the lower portions 62a, 72a of the first and second end plates 62, 72 are urged outwardly such that the first and second end plates 62, 72 pivot about the clamp rod 51, thereby causing the upper portions 62b, 72b to move inwardly towards each other in a clamping motion.

Each of the first and second end plates 62, 72 also includes a clamping surface or portion 66, 76 positioned at or near the upper portion 62b, 72b thereof. More specifically, the clamping portions 66, 76 extend along a length (e.g., all or substantially all) of the upper portions 62b, 72b of the first and second end plates 62, 72 and face "inwardly" towards each other. In the illustrated examples, the clamping portions 66, 76 are in the form of distinct bracket members that are coupled with the first and second end plates 62, 72, but in other examples, the clamping portions 66, 76 may be integrally formed therewith. The clamping portions 66, 76 include any number of holes 66a, 76a to receive the previously-described clamp pins 59. In some examples, the clamp pins 59 may be formed integrally with the clamping portions 64, 74.

The tail breaker assembly 81 includes a first breaker arm 82 and a second breaker arm 92 positioned near the first end 30a of the clamp mechanism 30. The first and second breaker arms 82, 92 include similar features as the first and second side plates 32, 42 and the first and second end plates 62, 72. In the illustrated example, the first and second breaker arms 82, 92 each include a lower portion 82a, 92a, respectively, an upper portion 82, 92b, respectively, a first coupling portion 83, 93, respectively, in the form of an opening that accommodates a first coupling member 85, 95 to rotatably couple the first and second side plates 32, 42, respectively, therewith, and a second coupling portion 83a, 93a, respectively, in the form of an opening that accommodates a second coupling member 85a, 95a to further couple the first and second side plates 32, 42, respectively, and to limit relative rotation therebetween. So configured, the first and second breaker arms 82, 92 are each rotatable relative to the first and second side plates 32, 42. Further, each of the first and second breaker arms 82, 92 includes an engaging arm member 84, 94 positioned at or near the upper portion 82b, 92b.

A resilient member in the form of a sheet spring 53 may be operably coupled with the first breaker arm 82 and the first side plate 32. A second sheet spring 53 may be operably coupled with the second breaker arm 92 and the second side plate 42. These sheet springs 53 urge the first and second breaker arms 82, 92 outwardly, or away from, the first and second side plates 32, 42. As a result of this urging by the sheet springs 53, the upper portions 82b, 92b of the first and second breaker arms 82, 92 are urged outwardly such that the first and second breaker arms 82, 92 pivot about the first coupling member 85, 95 thus having an open resting configuration.

Each of the first and second breaker arms 82, 92 also includes a clamping surface or portion 86, 96 positioned at or near the upper portion 82b, 92b thereof. More specifically, the clamping portions 86, 96 extend along a length (e.g., all or substantially all) of the upper portions 82b, 92b of the first and second breaker arms 82, 92 and face "inwardly" towards each other. In the illustrated examples, the clamping portions 86, 96 are in the form of distinct bracket members that are coupled with the first and second breaker arms 82, 92, but in other examples, the clamping portions 86, 96 may be integrally formed therewith. The clamping portions 86, 96 include any number of holes 86a, 96a to receive the previously-described clamp pins 59. In some examples, the clamp pins 59 may be formed integrally with the clamping portions 84, 94. The clamping portions 86, 96 are segmented into two sections that are rotatable relative to each other to break the shell of the shrimp, thus separating the shrimp shell from the tail shell.

As previously described, each of the first and second side plates 32, 42, the first and second end plates 62, 72, and the first and second breaker arms 82, 92 are movable relative to each other (in addition to being movable relative to the clamp rods 50, 51) and are spring loaded via respective springs such that the main clamp 31 and end clamp 62 are biased towards a closed position, and the tail breaker assembly 81 is biased towards an open position (see FIGS. 5, 6, 8, 9, & 10). In this configuration, the clamp pins 59 clamp and retain the shrimp 2 within the clamp mechanism 30. This arrangement will be described in further detail below.

With particular reference to FIGS. 10 and 12-18, the processing assembly 16 further includes a number of bracket members 100 each being operably coupled with the main gear 24 and the clamp mechanism 30. The bracket member 100 is generally anvil shaped and includes a body 102 having a base 104 and shrimp support region 106. The base 104 includes any number of mounting members in the form of bores 108 to receive bolts or pins (not illustrated) used to couple the bracket member 100 with the main gear 24. In some examples, the main gear 24 may include a mounting plate (not illustrated) to which the bracket members 100 may be operably coupled. The body 102 further includes rod bores 102a to receive the clamp rods 50, 51.

The shrimp support region 106 defines a surface or surfaces the shrimp 2 is disposed on during processing. The shrimp support region 106 includes a generally curved surface having a first end 106*a* and a second end 106*b*. During processing, the shrimp 2 is positioned on a central protrusion or ridge 109 on the shrimp support region 106. The first end 106*a* further defines a recessed region 110 that allows the head of the shrimp 2 to be positioned lower than the body of the shrimp on the shrimp support region 106. Notably, the recessed region 110 has a graduated slope, thus allowing clamp pins 59 coupled with the main clamp 31 to grip the shrimp head in this recessed region 110.

As previously noted, the body 102 includes rod bores 102*a* to receive the clamp rods 50, 51, thereby coupling the main clamp 31 and the small clamp assembly 61 therewith. More specifically, the clamp rod 50 is disposed through a first rod bore 102*a*, and the support flanges 33, 43 of the first and second side plates 32, 42 of the main clamp 31 are coupled with the clamp rod 50. Further, the second clamp rod 51 is disposed through a second rod bore 102*a*, and the support flanges 63, 73 of the first and second end plates 62, 72 of the small clamp assembly 61 are coupled with the second clamp rod 51. Any number of retention mechanisms may be used to retain and/or secure the support flanges 33, 43, 63, 73 with the clamp rods 50, 51.

With reference to FIGS. 3-8 and 19, the processing assembly 16 includes an alignment arrangement that includes the adjustable guide member 120 and the adjustable positioning roller assembly 140. Generally, the adjustable guide member 120 centers shrimp on the bracket member 100, while the adjustable positioning roller assembly 140 urges the shrimp 2 onto the bracket member 100 such that the shrimp 2 is disposed within the region defined by the clamp mechanism 30. More specifically, the adjustable guide member 120 includes a support member 122 and a number of guide arms 124 operably coupled with the support member 122. The guide arms 124 are spaced a distance from each other to define a gap to accommodate the shrimp 2. Further, the guide arms 124 are positioned above the clamp mechanism 30 and are generally aligned with the central protrusion 109 of the bracket member 100 such that upon passing through the adjustable guide member 120, the shrimp 2 is centered relative to the bracket member 100.

The guide arms 124 may be constructed from a resilient and/or flexible material and may be inwardly biased in a resting configuration. The guide arms 124 may also include a guide plate 126 disposed thereon that the shrimp 2 contacts during operation. The guide arms 124 may be adjusted as needed to selectively increase or decrease the gap between the guide plates 126 to accommodate shrimp 2 of varying sizes.

The adjustable positioning roller assembly 140 includes a roller arm 142 and a roller body 144. As previously noted, the adjustable positioning roller assembly 140 (and specifically, the roller body 144) exerts an urging force on the shrimp 2 to place the shrimp 2 on the shrimp support region 106 of the bracket member 100. The adjustable positioning roller assembly 140 is operably coupled with the drive assembly 24 via any number of gears, chains, belts, arms, and the like. Further, any number of additional roller bodies may be additionally used to exert an urging force on the shrimp 2.

The roller body 144 is disposed near the bracket member 100 and is adjustably coupled with the roller arm 142 to adjust the distance or clearance between the roller body 144 and the bracket member 100. The roller body 144 may be spring loaded to apply pressure on the shrimp 2, and particularly the shrimp head, to urge the shrimp head into the recessed region 110 of the shrimp support region 106. Additionally, the roller arm 142 is rotatably coupled with a bracket such that it may be moved forward and backward to accommodate shrimp 2 of varying sizes.

Figure 20:
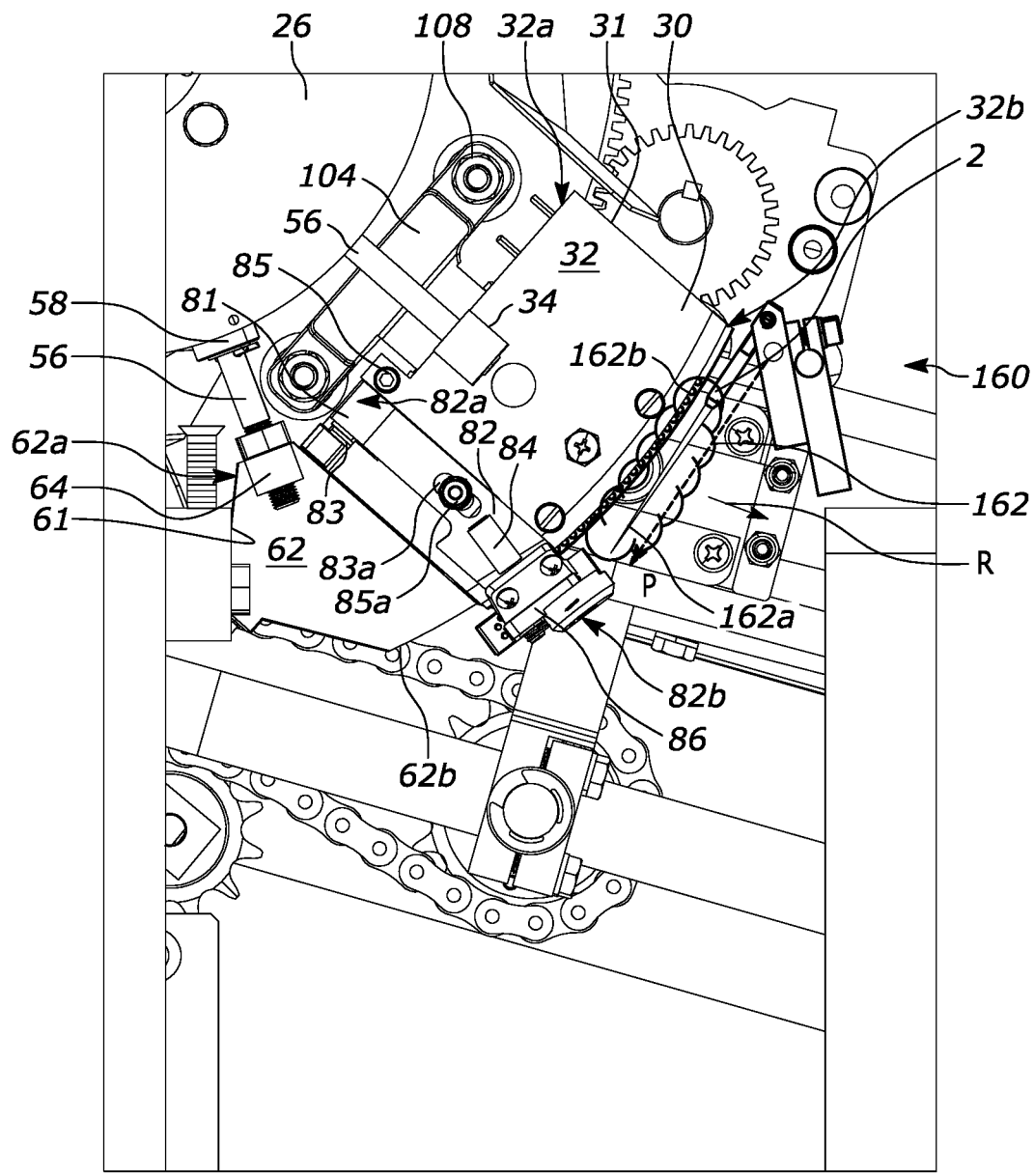
FIG. 20 illustrates a side elevation view of an example meat picking member in accordance with various embodiments.
Figure 21:
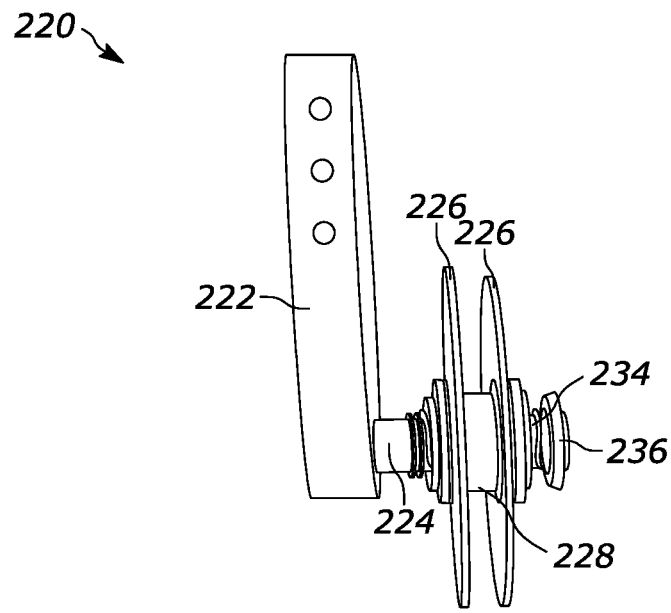
FIG. 21 illustrates a front elevation view of an example adjustable guide member for use with the example processing assembly of FIGS. 3-21 in accordance with various embodiments.
Figure 22:
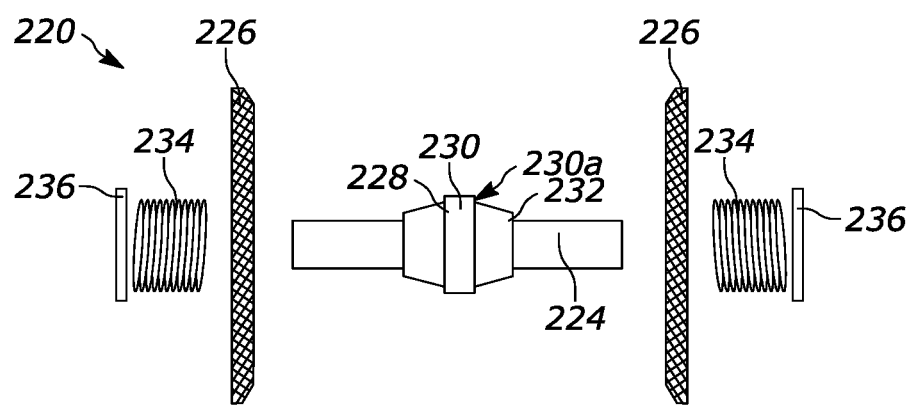
FIG. 22 illustrates an exploded side elevation view of the example adjustable guide member of FIG. 21 in accordance with various embodiments.
Figure 23:
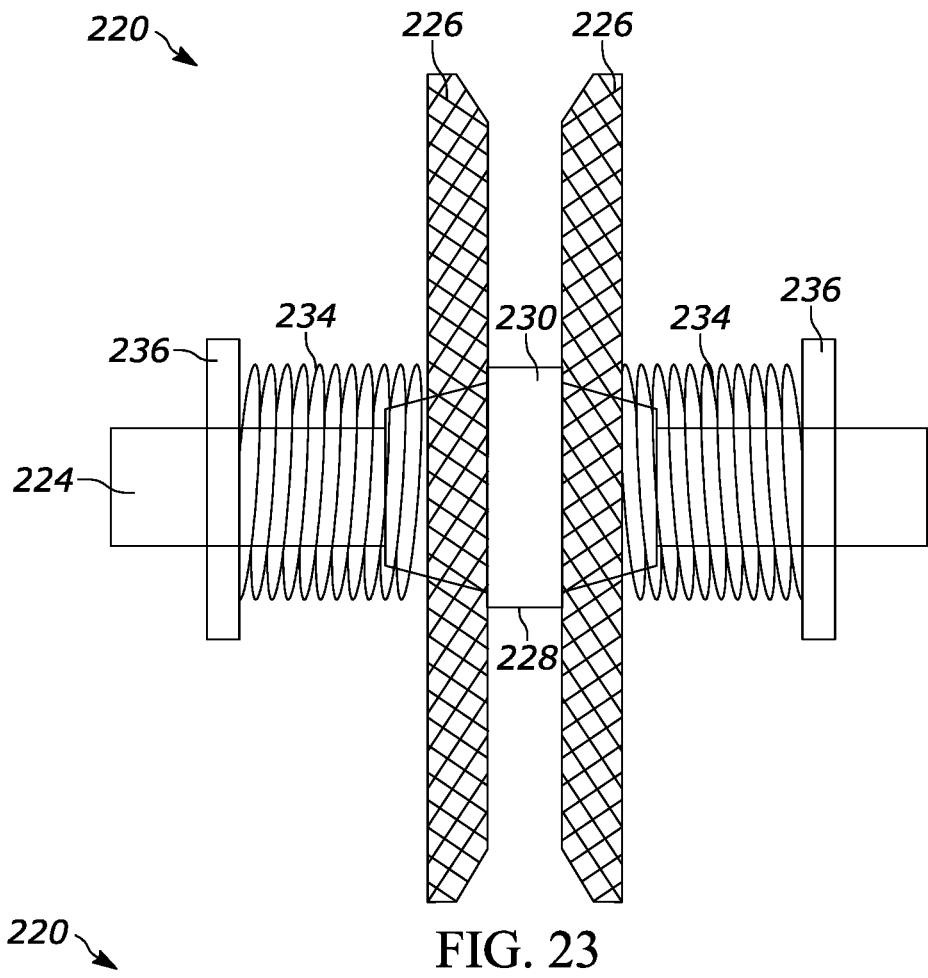
FIG. 23 illustrates a side elevation view of the example adjustable guide member of FIGS. 21 and 22 in a first configuration in accordance with various embodiments.

Generally speaking, the adjustable meat picking member 160 is movable relative to the clamp mechanism 30 and travels along a path to pierce the shrimp body and separate the shrimp body from the shrimp head. As illustrated in FIG. 20, the adjustable meat picking member 160 includes an oscillating picker arm 162 having a piercing portion 162*a* that longitudinally penetrates the shrimp 2 by moving in direction "P" at a location other than the shrimp head, (i.e., the body) region, and further includes a sliding portion 162*b* that slidably engages the shrimp 2 to remove the shrimp meat (i.e., the body) from the shrimp shell and shrimp head in a direction "R" that is generally perpendicular to the dorsal side of the shrimp 2. The adjustable meat picking member 160 may be adjusted via a timing feature that allows the user to alter the point when the oscillating picker arm 162 contacts the shrimp 2. Further discussion of the mechanics and operation of one such picker assembly 200 is described in U.S. Pat. No. 7,867,067, filed on Mar. 12, 2009, and U.S. Pat. No. 9,833,005, filed on Jan. 9, 2017, the entire contents of which are expressly incorporated herein by reference.

In operation, the shrimp 2, disposed in the loading tray 14, moves towards one of the clamp mechanisms 30, which rotates along with the main gear 24. As the clamp mechanism 30 rotates, the small clamp assembly 61 grasps the tail of the shrimp 2 to remove it from the tray 14. More specifically, during rotation of the clamp mechanism 30, the bumpers 58 coupled with the first and second end plates 62 also engage the engagement regions 28 of the drive cam 26, thereby causing the lower portions 62*a*, 72*a* of the first and second end plates 62, 72 to rotate inwardly while the upper portions 62*b*, 72*b* of the first and second end plates 62, 72 rotate outwardly about the second clamp rod 51. This rotation causes the clamping portions 66, 76 of the first and second end plates 62, 72 to be moved to an open position. The main clamp 31 and the small clamp assembly 61 remain in this open position until the bumpers disengage the drive cam 26.

Figure 11:
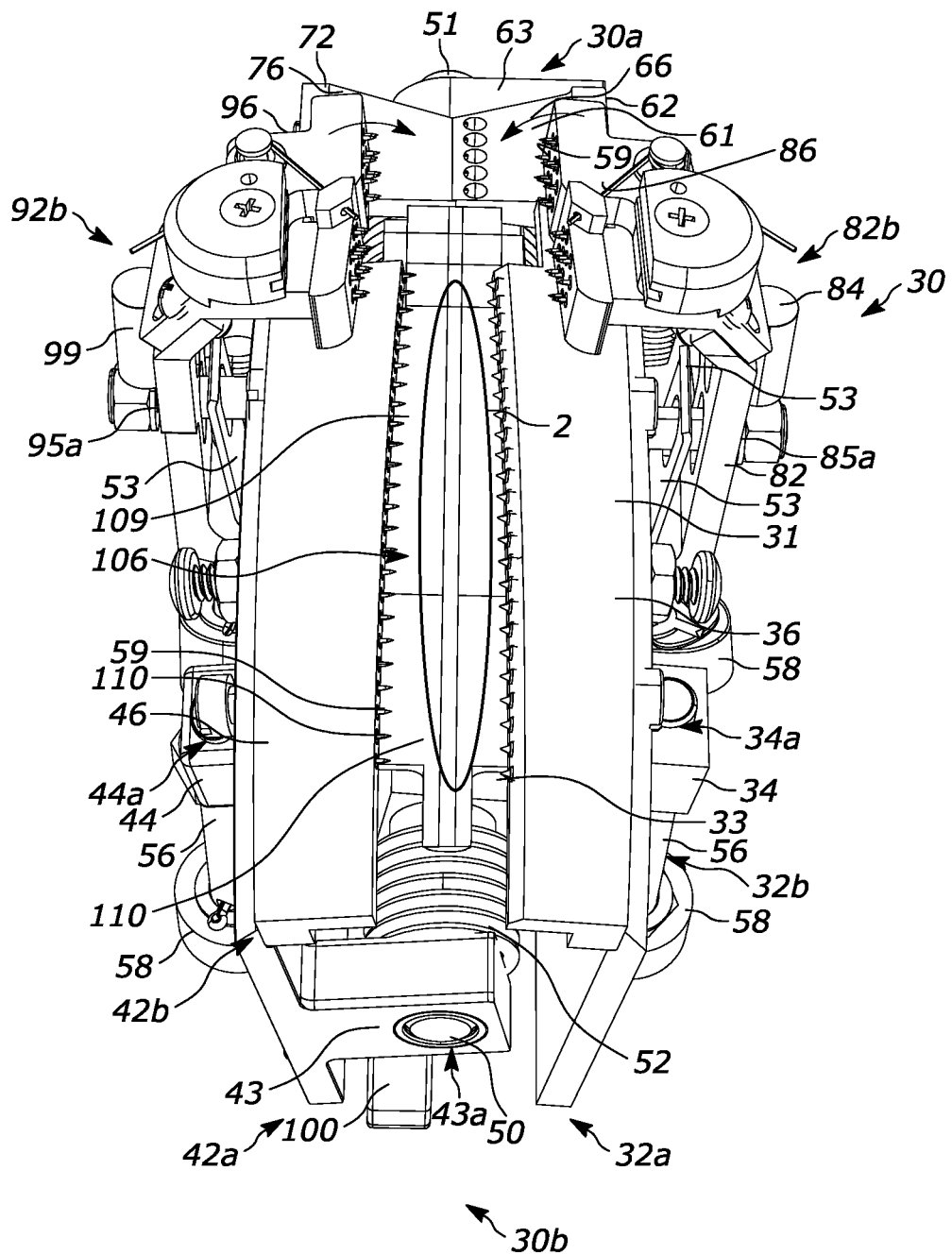
FIG. 11 illustrates an upper perspective view of the example clamp mechanism of FIGS. 9 and 10 in an open configuration in accordance with various embodiments.
Figure 12:
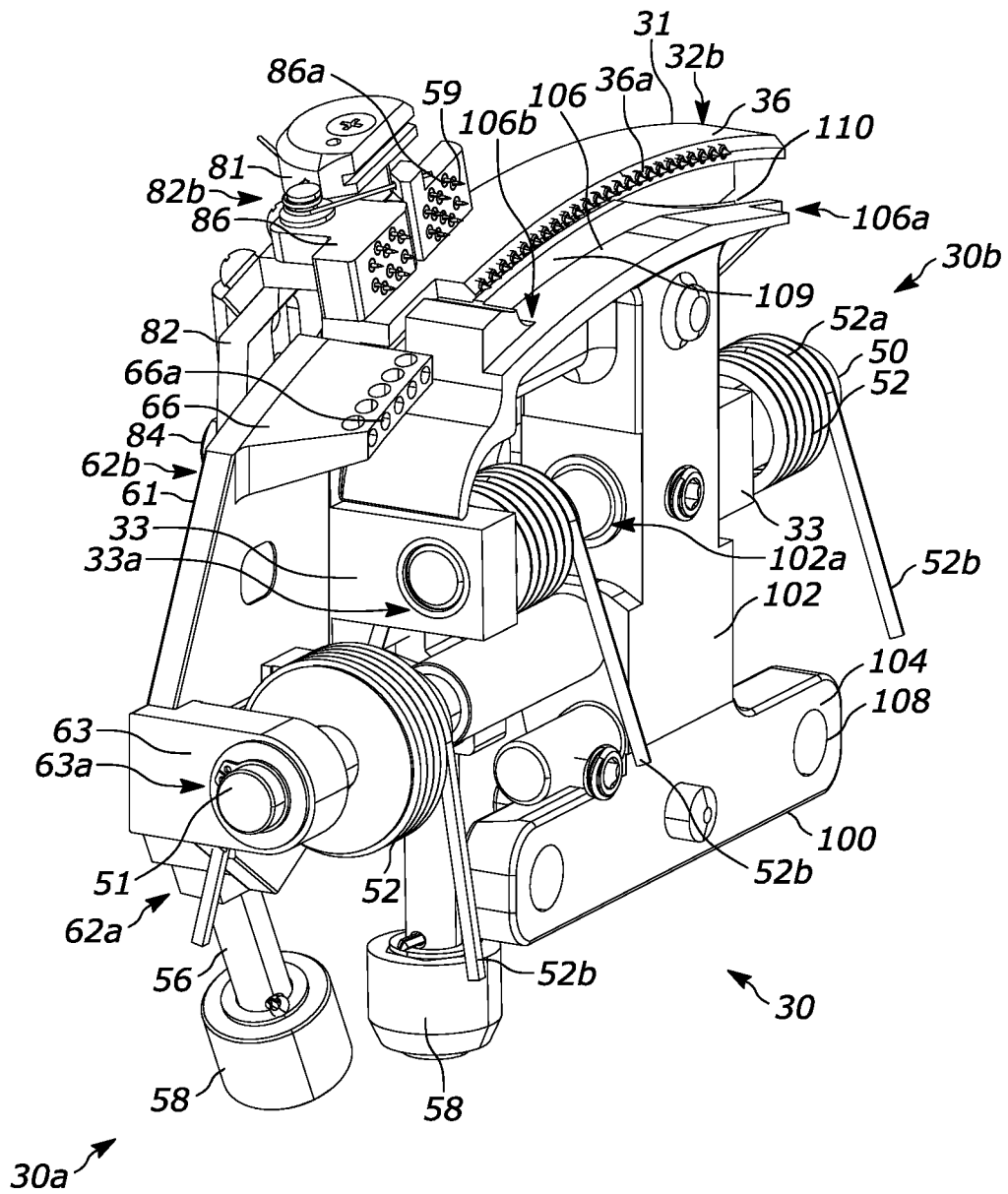
FIG. 12 illustrates a front perspective view of a portion of the example clamp mechanism of FIGS. 9-11 in accordance with various embodiments.
Figure 13:
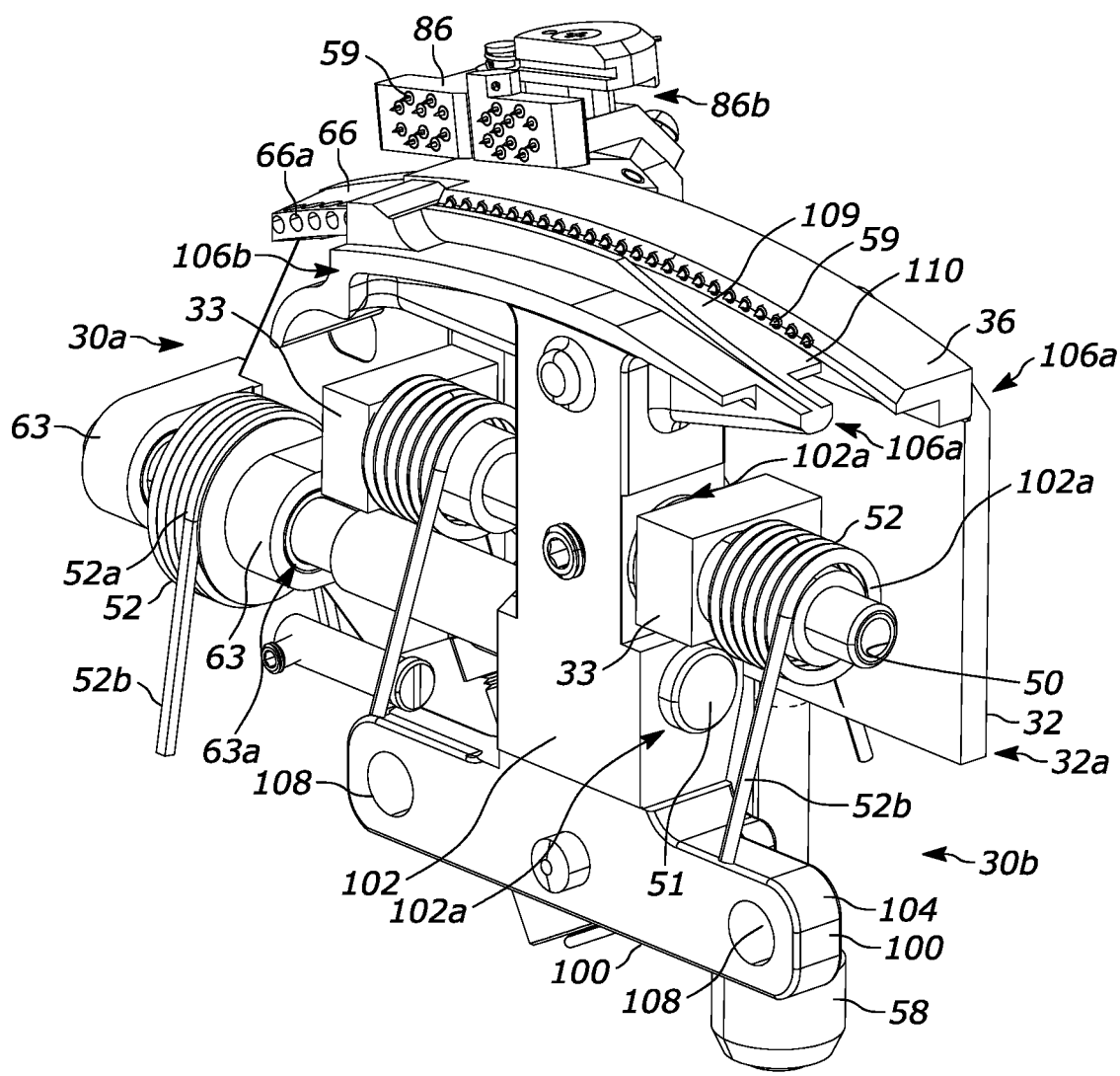
FIG. 13 illustrates a rear perspective view of a portion of the example clamp mechanism of FIGS. 9-12 in accordance with various embodiments.
Figure 14:
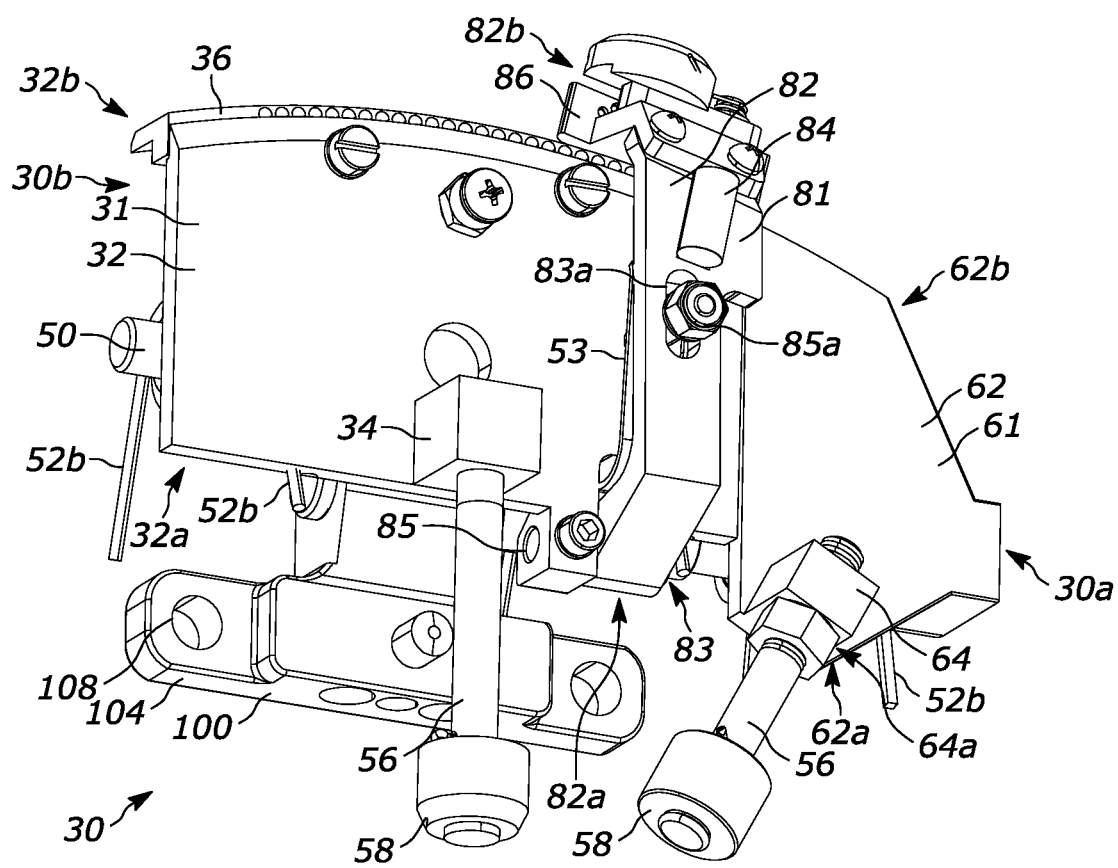
FIG. 14 illustrates a lower side perspective view of a portion of the example clamp mechanism of FIGS. 9-13 in accordance with various embodiments.
Figure 15:
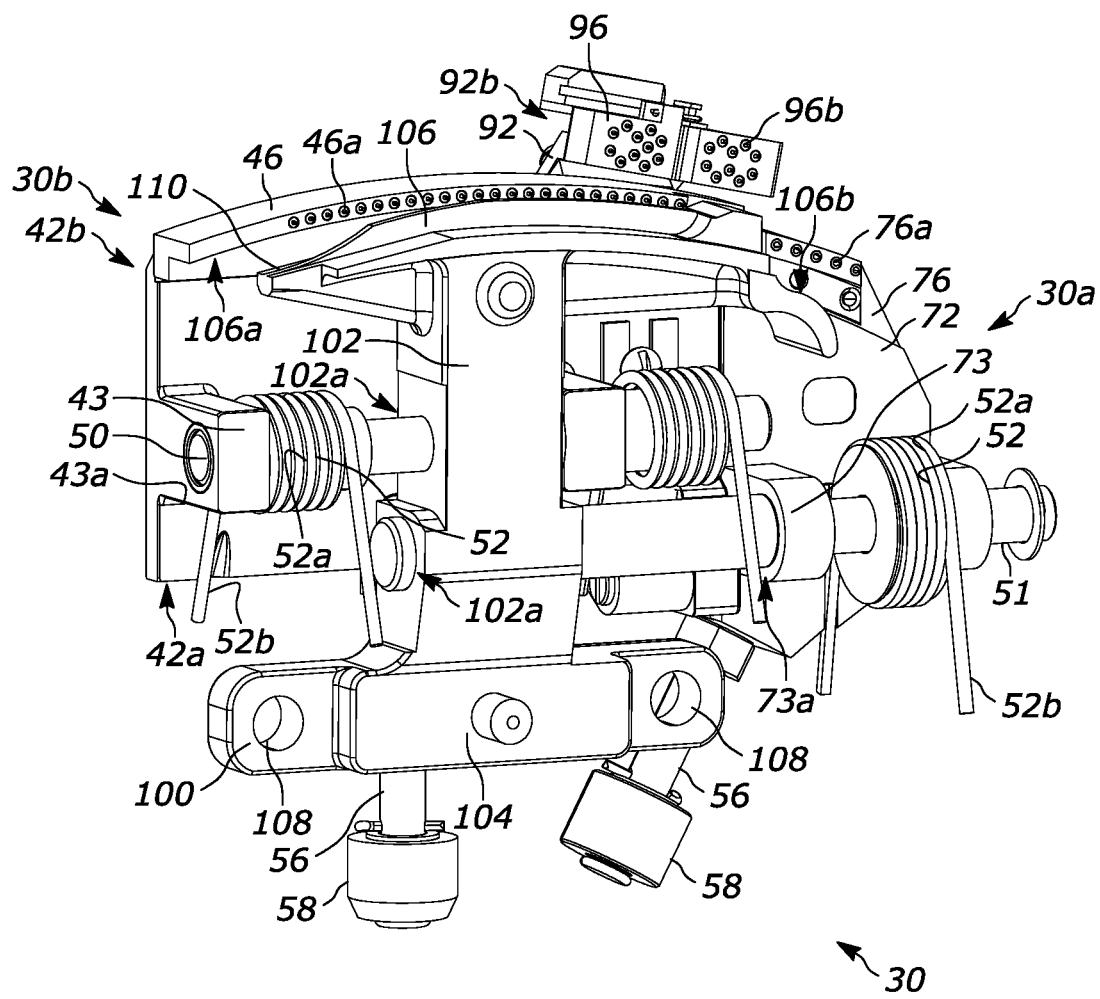
FIG. 15 illustrates a rear perspective view of a second portion of the example clamp mechanism of FIGS. 9-14 in accordance with various embodiments.
Figure 16:
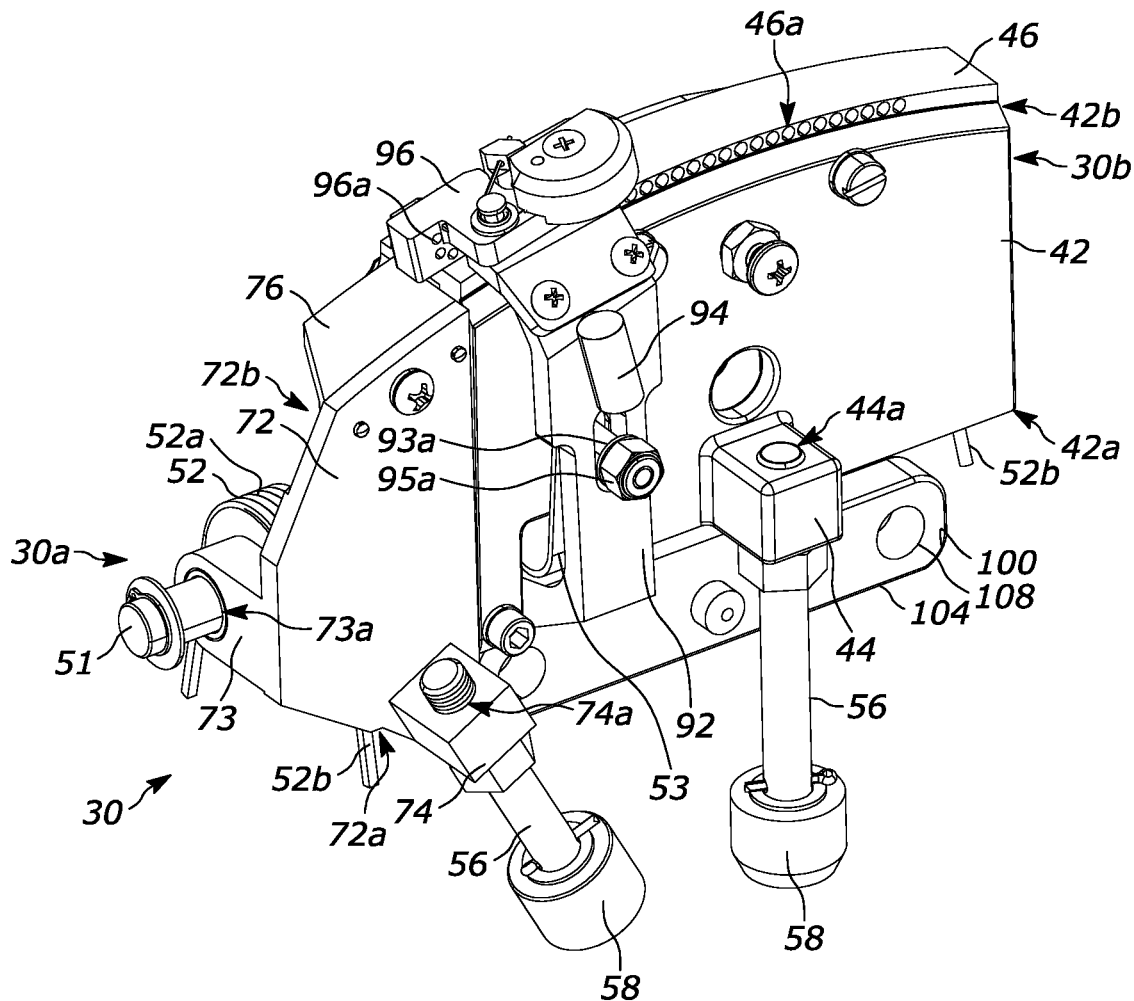
FIG. 16 illustrates a front side perspective view of the second portion of the example clamp mechanism of FIG. 15 in accordance with various embodiments.
Figure 17:
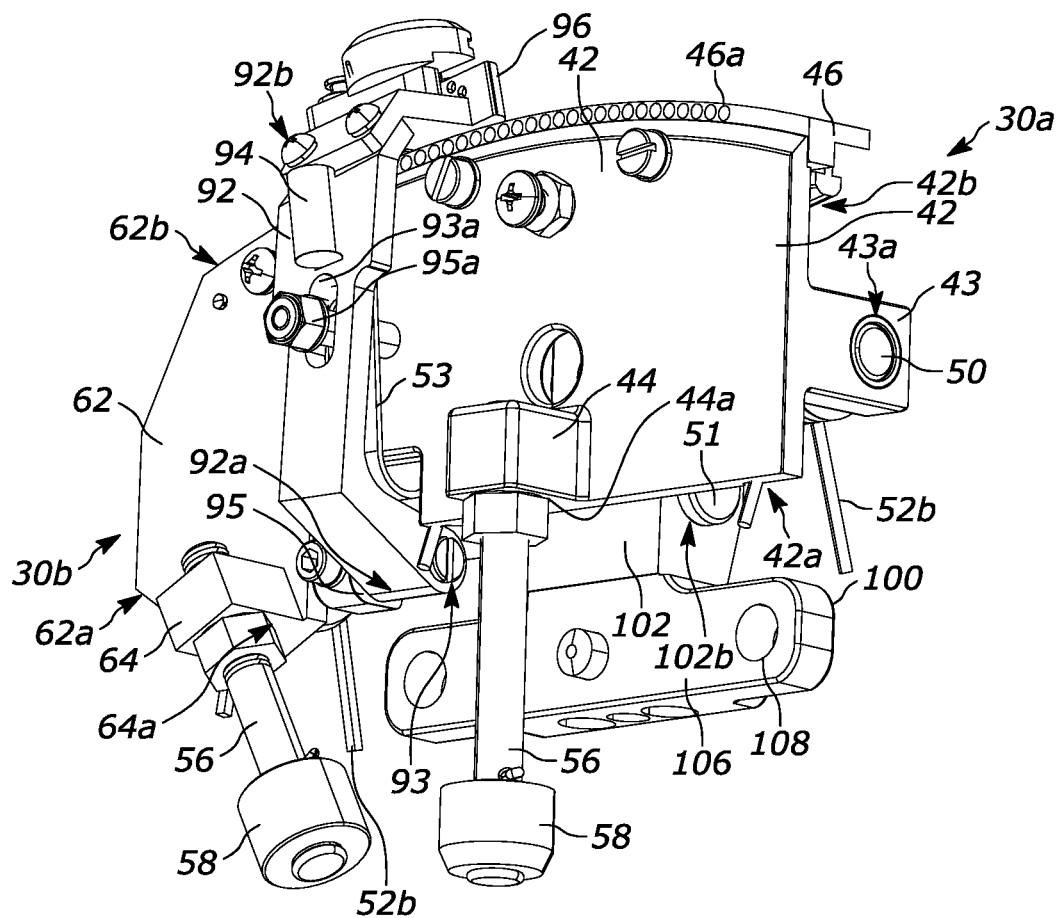
FIG. 17 illustrates a lower rear side perspective view of the second portion of the example clamp mechanism of FIGS. 15 and 16 in accordance with various embodiments.
Figure 18:
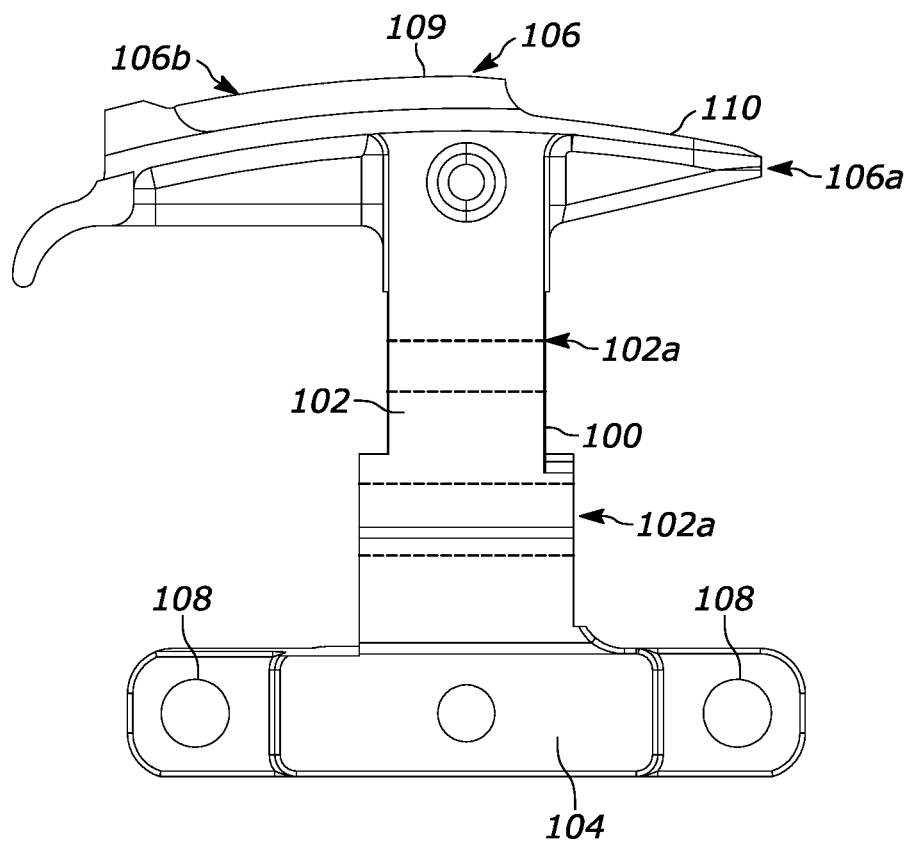
FIG. 18 illustrates a side elevation view of an example bracket member for use in the example processing assembly of FIGS. 3-17 in accordance with various embodiments.
Figure 19:
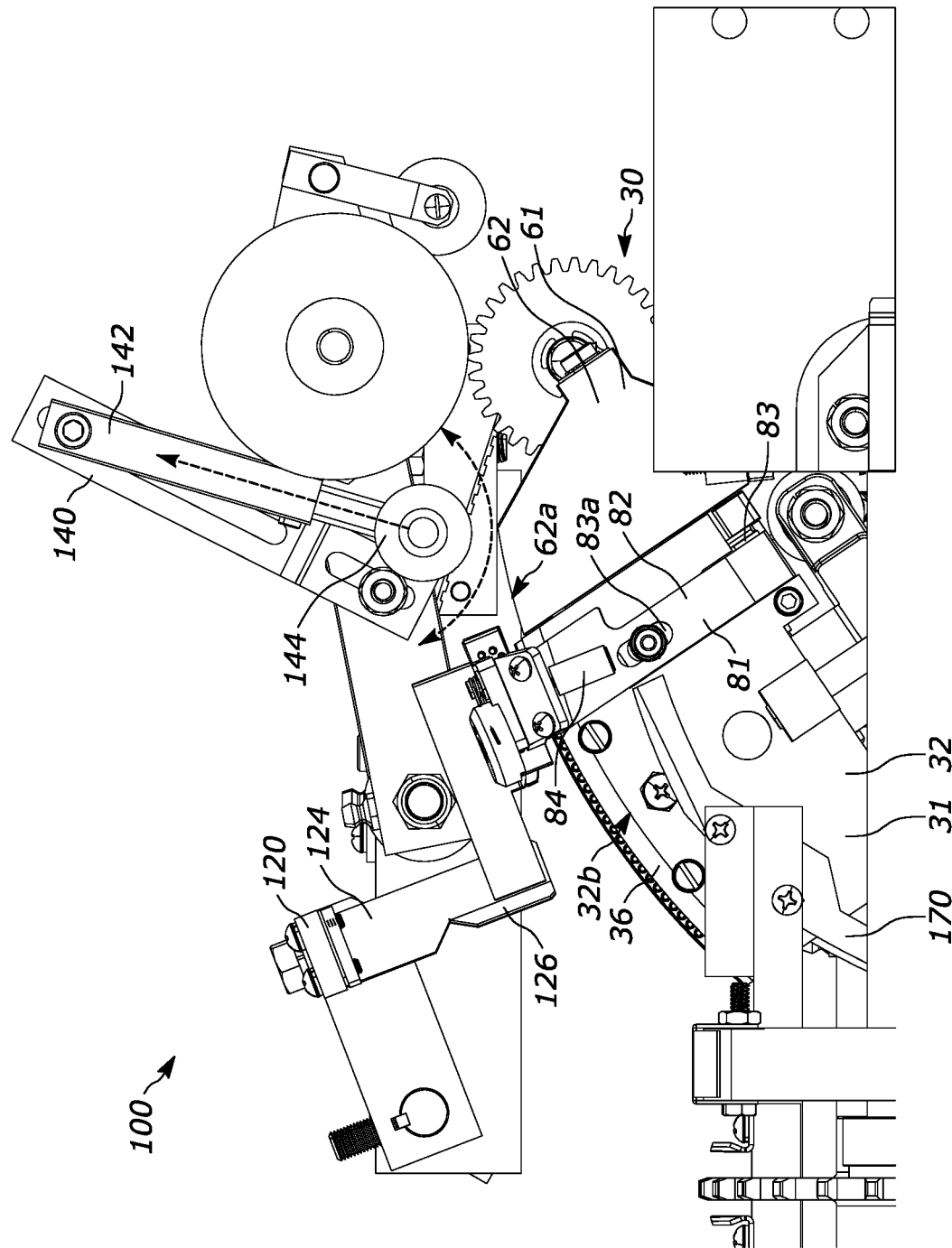
FIG. 19 illustrates a side elevation view of an example adjustable positioning roller assembly for use with the example processing assembly of FIGS. 3-18 in accordance with various embodiments.

As illustrated in FIG. 11, as the clamp mechanism 30 continues to rotate, the bumpers 58 coupled with the end small clamp assembly 61 disengage the drive cam 26. As a result, the torsion spring 52 coupled with the end small clamp assembly 61 urges the clamping portions 66, 76 of the first and second end plates 62, 72 to rotate about the clamp rod 51 to the closed position in which the clamp pins 59 grasp the tail of the shrimp 2.

Additionally, as the clamp mechanism 30 rotates and passes under the loading trays 14, the engaging arm members 84, 94 slidably contact and engage preliminary engagement cams 170 coupled with the frame assembly 13. These preliminary engagement cams 170 are each disposed at a location that projects and/or interrupts the motion of the engaging arm members 84, 94 such that the sliding engagement causes the first and second breaker arms 82, 92 to move inwardly (i.e., the upper portions 82*b*, 92*b* rotate inwardly about the first coupling members 85, 95), thus allowing the first and second arms 82, 92 and upper portions 82*b*, 92*b* to pass under the loading trays 14. The first and second engaging arm members 84, 94 disengage the cams 170, and thus return the first and second arms 82, 92 to their outward position.

While the small clamp assembly 61 retains the shrimp 2, the main clamp 31 is disposed in an open configuration. More specifically, the bumper 58 and/or the drive arm 56 coupled with the first and second side plates 32, 42 engage the engagement regions 28 of the drive cam 26, which protrudes inwardly into the path of the bumpers 58. As a result, the bumpers 58 rotate inwardly, overcoming the resilience of the torsion springs 52, thereby causing the lower portions 32*a*, 42*a* of the first and second side plates 32, 42 to also rotate inwardly while the upper portions 32*b*, 42*b* of the first and second side plates 32, 42 rotate outwardly about the clamp rod 52. As a result, the clamping portions 36, 46 of the first and second side plates 32, 42 are moved to an open position.

Next, the shrimp 2 is first aligned by the adjustable guide member 120, and subsequently by the adjustable positioning roller assembly 140. More specifically, the tail end of the shrimp 2, retained by the small clamp assembly 61, passes between the guide plates 126 disposed on the guide arms 124. As a result, the guide plates 126 cause the shrimp 2 to shift laterally until it is centered on the bracket member 100.

Next, the shrimp 2 passes under the roller body 144 of the adjustable positioning roller assembly 140, which causes the body of the shrimp 2 to be urged downwardly onto the bracket member 100. More specifically, the body of the shrimp 2 is urged against the protrusion 109 by the roller body 144, and the head of the shrimp 2 is urged into the recessed region 110 of the shrimp support region 106. As the clamp mechanism 30 continues to rotate, the bumpers 58 coupled with the main clamp 31 disengage from the drive cam 26. As a result, the torsion spring 52 coupled with the main clamp 31 urges the clamping portions 36, 46 of the first and second side plates 32, 42 to rotate about the clamp rod 50 to the closed position in which the clamp pins 59 grasp the body of the shrimp 2.

Each plate of the main clamp 31 and the small clamp assembly 61 is arranged to exert an approximately equal force on the shrimp so as to avoid damaging or disfiguring one side of the shrimp 2 relative to the other. Further, each of the main clamp 31 and the small clamp assembly 61 may use resilient members having different resilience values so as to selectively retain different regions of the shrimp 2 with varying forces. For example, the small clamp assembly 61 apply more grasping force to the shrimp 2 than the main clamp 31.

As previously noted, after the shrimp 2 is retained by the clamp mechanism 30, any additional processing such as breaking the tail, cutting, deveining, and/or cleaning may occur before the clamp mechanism 30 reaches the adjustable meat picking member 160. For example, the tail breaker assembly 81 may reengage the shrimp 2 to break and separate the tail shell from the shell of the body of the shrimp 2. These additional processes may occur at any point during processing of the shrimp 2.

As the clamp mechanism 30 continues to rotate towards the adjustable meat picking member 160, the oscillating picker arm 162 presses against the shrimp head (which is disposed "lower" than the shrimp body in the recessed region 110 of the bracket member 100), and as the meat picking member 160 moves forward, it will bypass the shrimp head and enter the shrimp tail where the tail and head meet by moving in direction P. The oscillating picker arm 162 is dimensioned such that the sliding portion 162*b* thereof engages all or substantially all of the longitudinal length of the body of the shrimp 2. When the oscillating picker arm 162 continues its movement along the path away from the main clamp 31 in the direction R, the body of the shrimp 2 will move with the oscillating picker arm 162, while the clamp pins 59 retain the shell and head of the shrimp 2 within the main clamp 31. This relative movement decapitates the shrimp 2, separating the shrimp body (and meat) from the shrimp head.

The shrimp processing machine 10 described herein may be constructed using any number of suitable alternative approaches. For example, FIGS. 21-24 illustrate a second example adjustable guide member 220. It is appreciated that the adjustable guide member 220 illustrated in FIGS. 21-24 may include similar features to the adjustable guide member 120 illustrated in FIGS. 1-20, and accordingly, elements illustrated in FIGS. 21-24 are designated by similar reference numbers indicated in the embodiment illustrated in FIGS. 1-20 increased by 100. Accordingly, these features will not be described in substantial detail. Further, it is appreciated that any of the elements described with regards to the adjustable guide member 120 may be incorporated into the adjustable guide member 220.

In this example, the adjustable guide member 220 includes a strut 222 operably coupled with the frame assembly 13, a mounting shaft 224 operably coupled with the strut 222, and a number of mount disks 226 being movably coupled with the mounting shaft 224. The mount disks 226 operate to center the shrimp 2 on the bracket member 100 and include a beveled edge. The adjustable guide member 220 further includes a mount barrel 228 disposed on the mounting shaft 224, resilient members in the form of coil springs 234, and retaining members in the form of lock washers 236.

The mount barrel 228 includes a central region 230 and two tapered regions 232 extending from the central region 230. The mount barrel 228 is generally hollow to accommodate the mounting shaft 224. More specifically, the central region 230 has a generally constant diameter, whereas the tapered regions 232 has a body that decreases in diameter in the distal direction. Further, an edge 230*a* of the central region 230 defines a bump or stop to limit movement of the mount disks 226.

As previously noted, the mount barrel 228 is disposed on the mounting shaft 224. The mount disks 226, having a hole dimensioned to receive the tapered regions 232 of the mount barrel 228, is placed thereon. The edge 230*a* of the central region 230 prevents the mount disks 226 from moving onto the central region 230 of the mount barrel. Next, the coil springs 234 are placed onto the mounting shaft 224, and are retained in a compressed configuration by the lock washers 236. As a result, the mount disks 226 are urged inwardly towards the central region 230.

Figure 24:
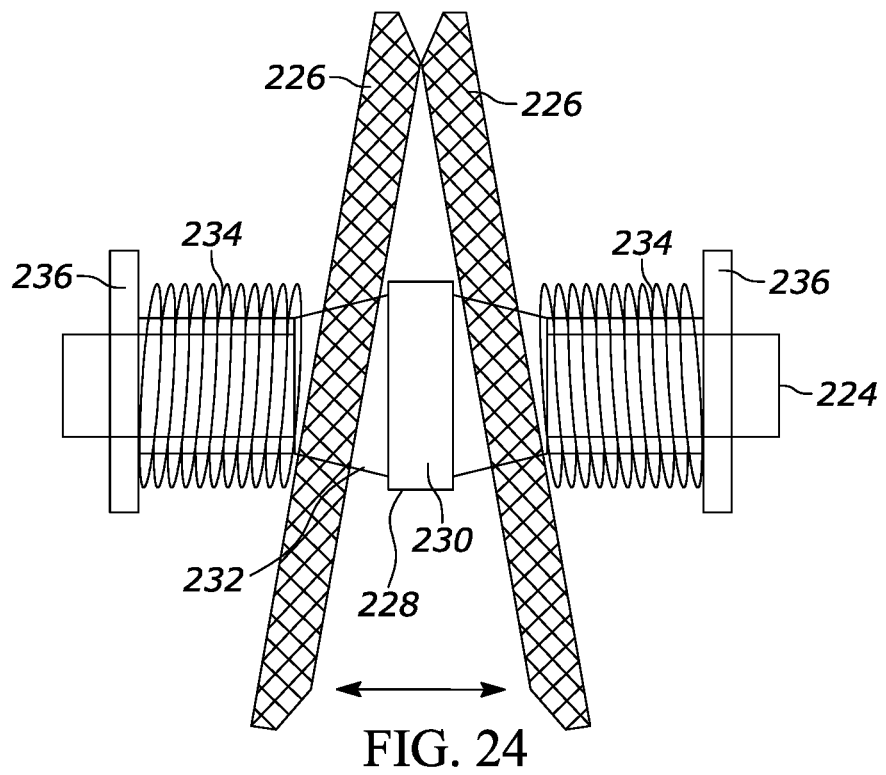
FIG. 24 illustrates a side elevation view of the example adjustable guide member of FIGS. 21-23 in a second configuration in accordance with various embodiments.

As with the adjustable guide member 120, the adjustable guide member 220 is configured to be centrally aligned with the protrusion 109 of the bracket member 100 via selectively positioning the strut 222 on the frame assembly 13. With reference to FIG. 24, as the shrimp 2 passes through the central region 230 between the mount disks 226, the body of the shrimp 2 may urge the mount disks 226 outwardly against the coil springs 234. However, the coil springs 234 will exert a force on the shrimp 2 that positions and aligns the shrimp 2 with the protrusion 109 of the bracket member 100. Because the mount disks 226 may rotate freely, resistance is minimal on the shrimp 2 as it passes therethrough. Further, because the mount disks 226 are mounted on the tapered region 232, they can pivot freely without the center hole binding on the mount barrel 228. Once the shrimp 2 passes through the mount disks 226, the coil springs 234 push the mount disks 226 back against the central region 230, causing them to return to a radially centered position.

Figure 25:
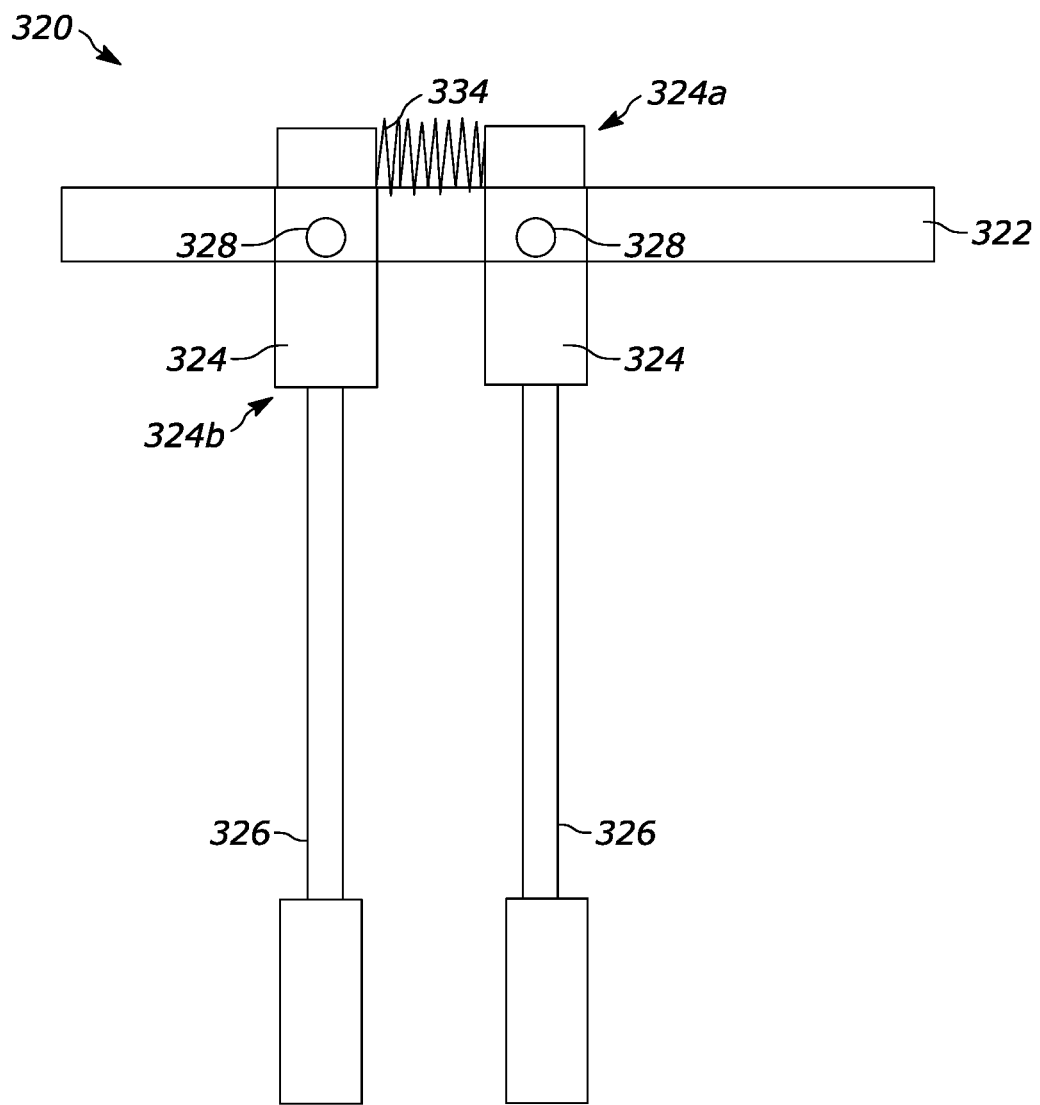
FIG. 25 illustrates a side elevation view of an alternative adjustable guide member for use with the example processing assembly of FIGS. 3-21 in accordance with various embodiments of the present disclosure
Figure 26:
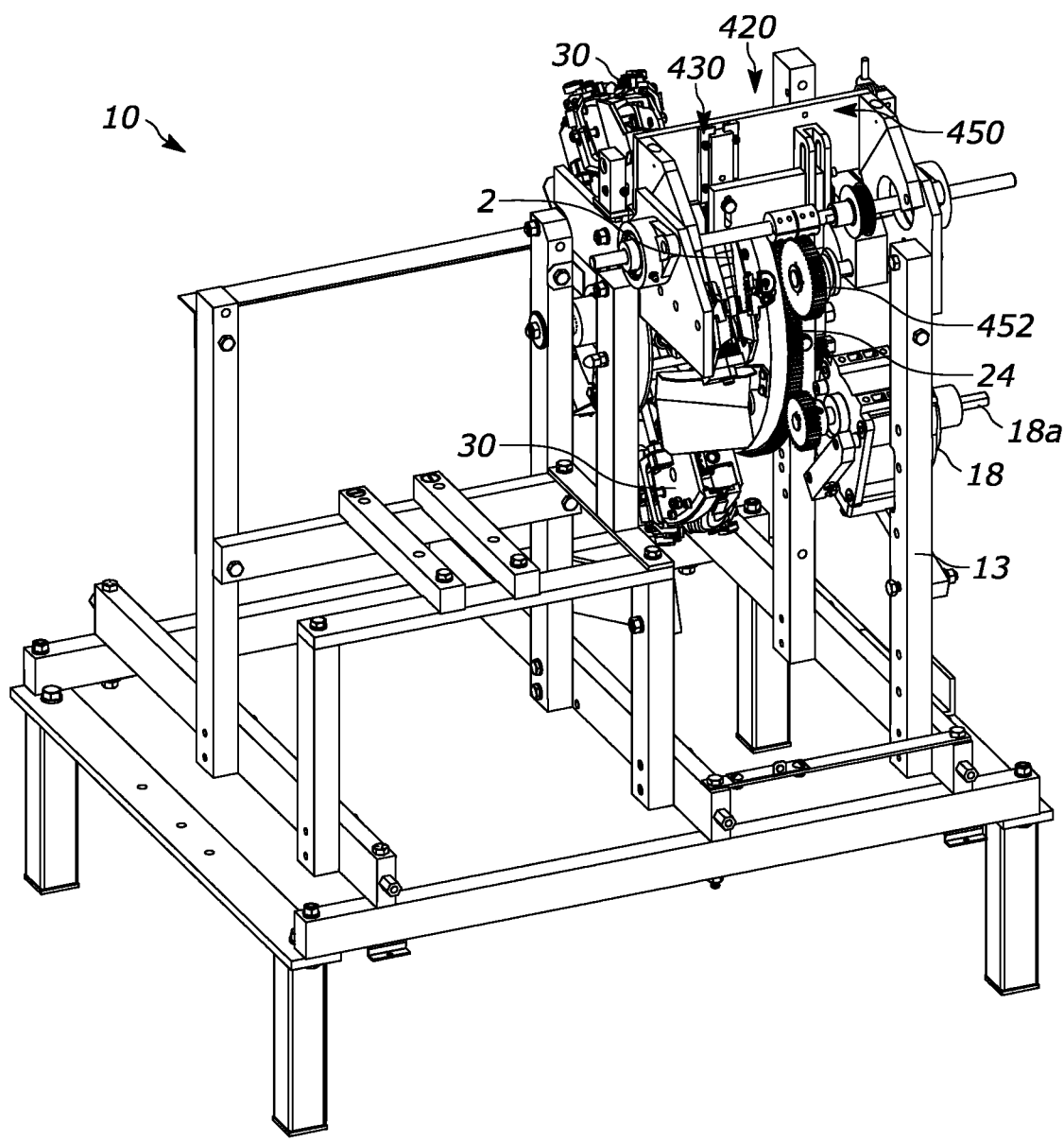
FIG. 26 illustrates a perspective view of an alternative example shrimp processing machine having an alternative processing assembly including an accessory decapitation system in accordance with various embodiments.
Figure 27:
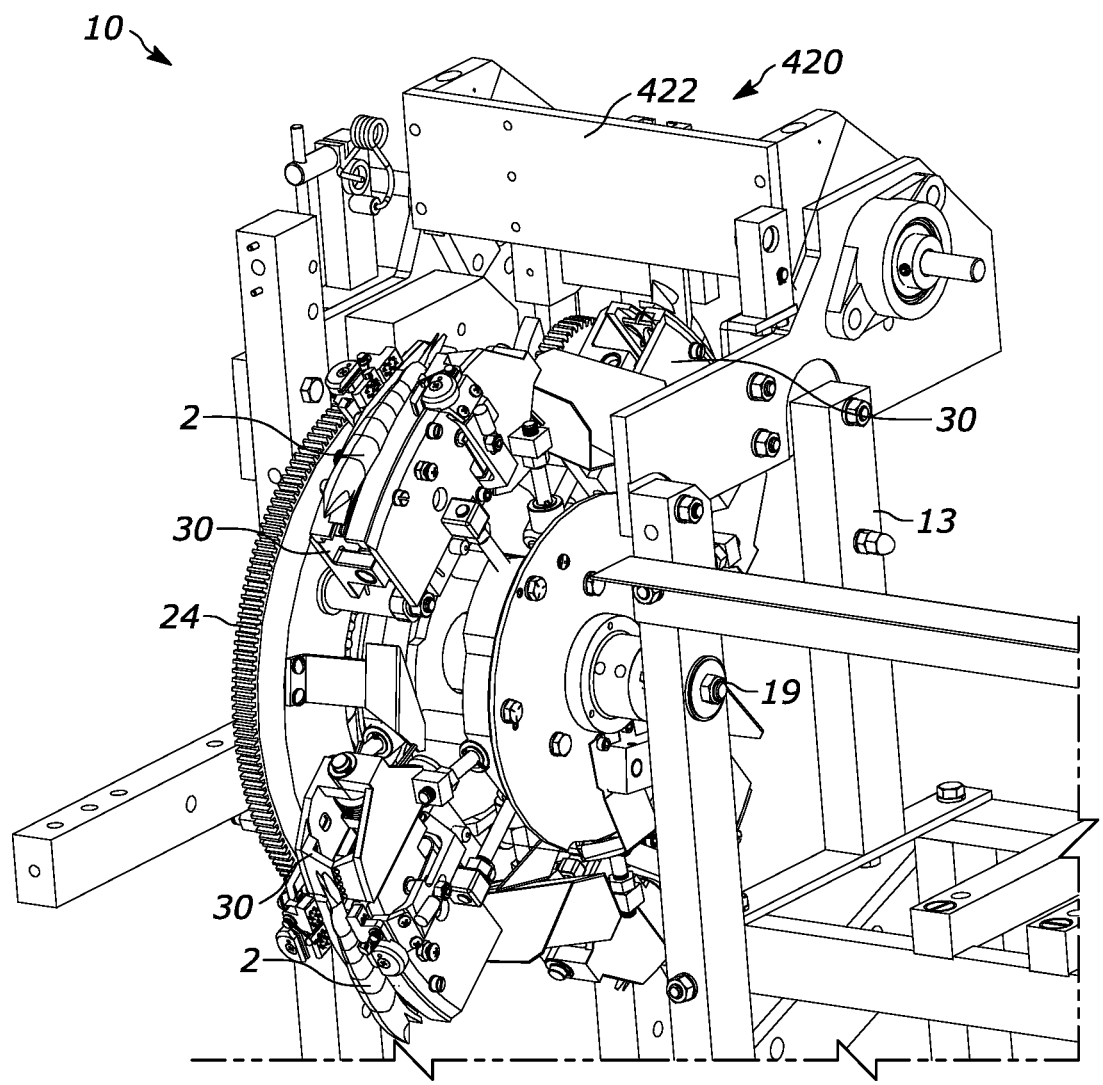
FIG. 27 illustrates a front perspective view of the example shrimp processing machine of FIG. 26 in accordance with various embodiments.
Figure 28:
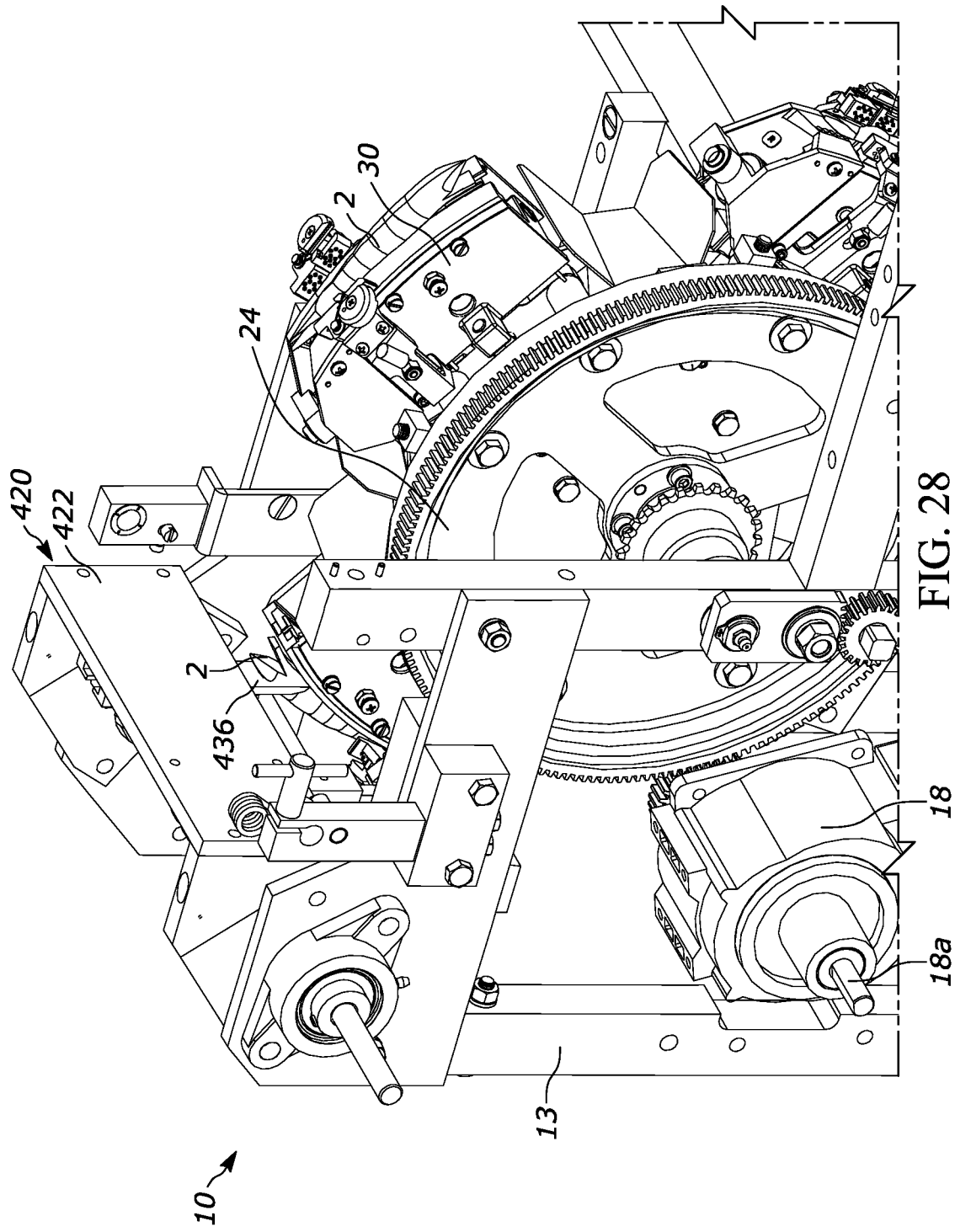
FIG. 28 illustrates a front perspective view of the example processing assembly of FIGS. 26 and 27 in accordance with various embodiments.
Figure 29:
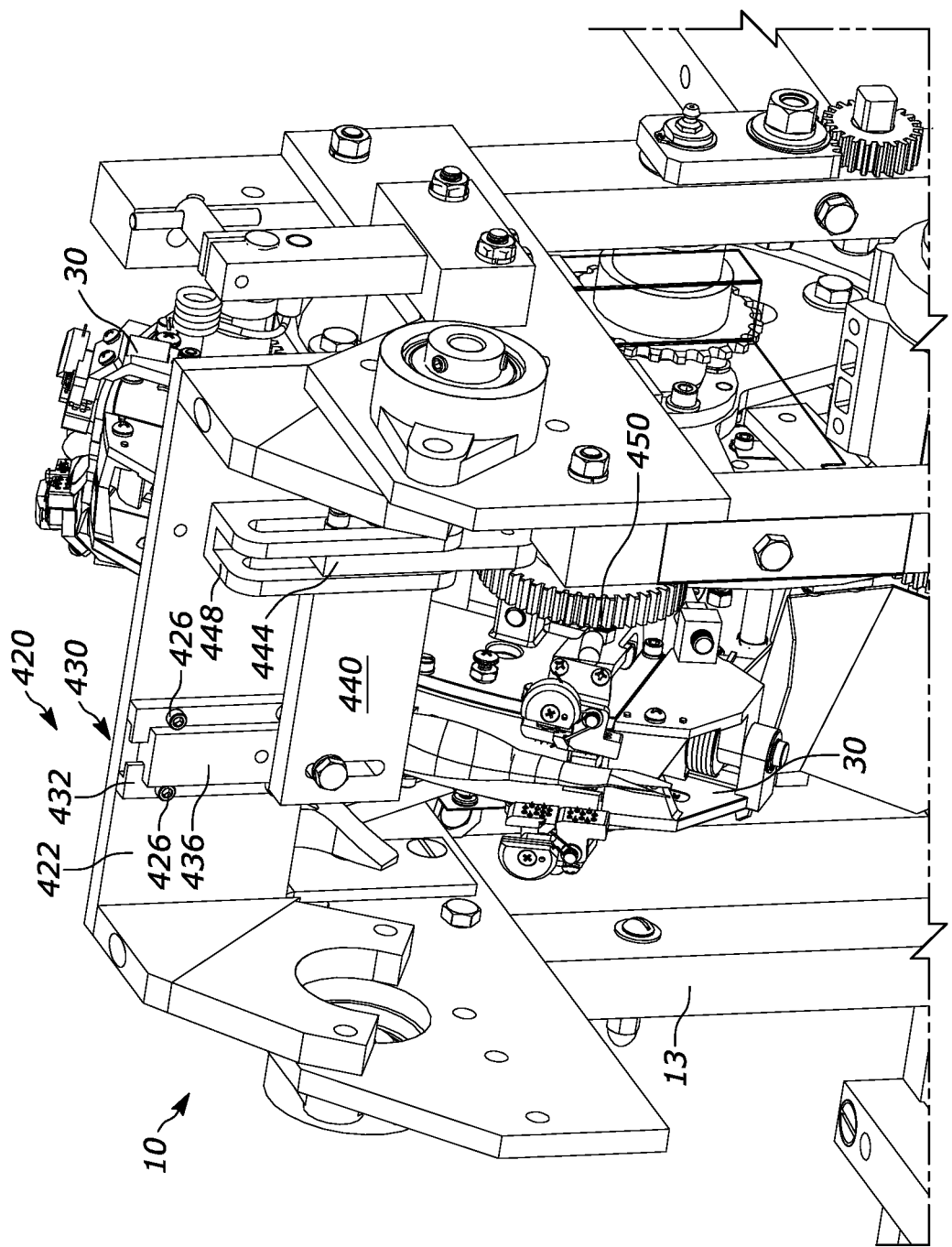
FIG. 29 illustrates a rear perspective view of the example processing assembly of FIGS. 26-28 in accordance with various embodiments.
Figure 30:
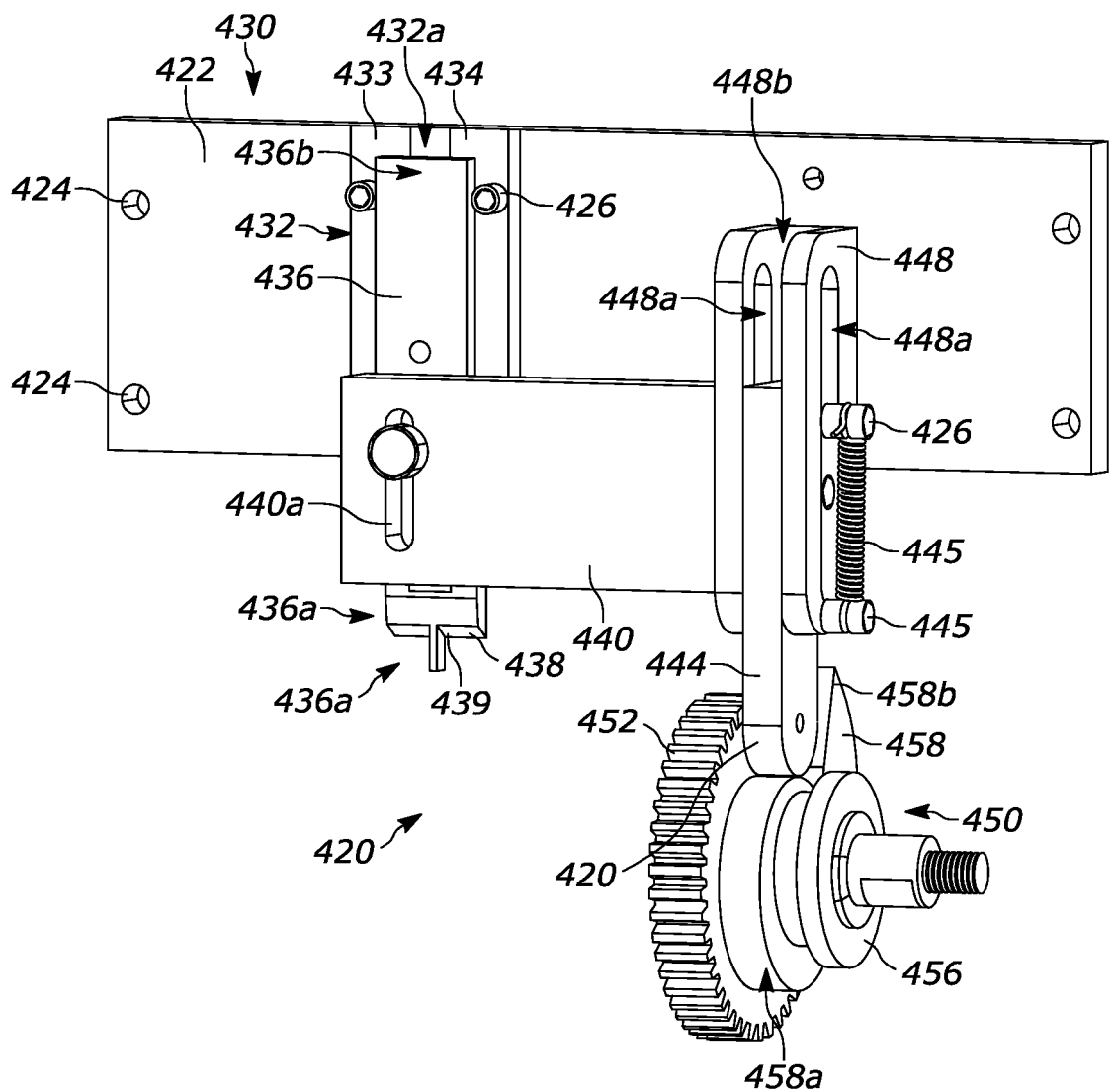
FIG. 30 illustrates a rear perspective view of the example decapitation system of the example processing assembly of FIGS. 26-29 in accordance with various embodiments.
Figure 31:
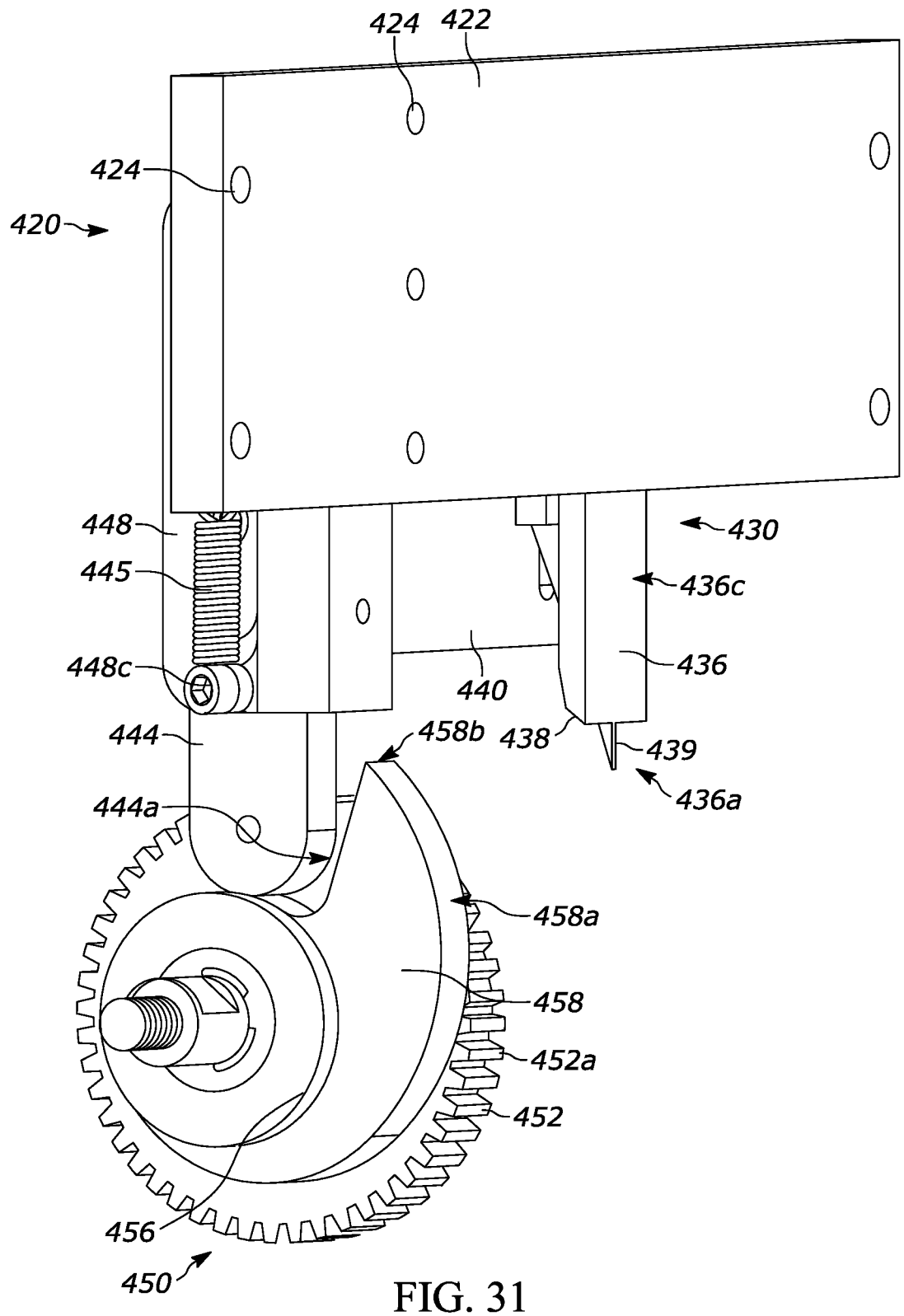
FIG. 31 illustrates a front perspective view of the example decapitation system of FIG. 30 in accordance with various embodiments.

FIG. 25 illustrates a third example adjustable guide member 320. It is appreciated that the adjustable guide member 320 illustrated in FIG. 25 may include similar features to the adjustable guide members 120 and 220 illustrated in FIGS. 1-24, and accordingly, elements illustrated in FIG. 25 are designated by similar reference numbers indicated in the embodiments illustrated in FIGS. 1-24 increased by 100 and 200, respectively. Accordingly, these features will not be described in substantial detail. Further, it is appreciated that any of the elements described with regards to the adjustable guide members 120 and 220 may be incorporated into the adjustable guide member 320.

In this example, the adjustable guide member 320 is in the form of two spring-loaded members and includes a strut 322 operably coupled with the frame assembly 13, a number of mounting members 324 having an upper portion 324a and a lower portion 324b and being operably coupled with the strut 322, and a number of mount forks 326 being coupled with the mounting members 324. The mount forks 326 operate to center the shrimp 2 on the bracket member 100 and include a beveled edge. The adjustable guide member 320 further includes pivot pins 328 that rotatably couple each of the mounting members 324 to the strut 322 and a resilient member in the form of a coil spring 334.

The coil spring 334 is configured to urge the upper portion 324a of the mounting members 324 outwardly such that each of the mounting members 324 rotate about the pivot pins 328. This rotation causes the lower portion 324b of the mounting members 324, and thus the mount forks 326, to be urged inwardly towards each other. As with the adjustable guide members 120 and 220, the adjustable guide member 320 is configured to be centrally aligned with the protrusion 109 of the bracket member 100 via selectively positioning the strut 322 on the frame assembly 13.

As the shrimp 2 passes through the central region between the mount forks 326, the body of the shrimp 2 may urge the mount forks 326 outwardly, causing the mounting member 324 to rotate about the pivot pins 328. Accordingly, the upper portion 324a of each of the mounting members 324 moves inwardly, thereby compressing the coil spring 334. The coil spring 334 exerts a force on the mounting member 324 to position and align the shrimp 2 with the protrusion 109 of the bracket member 100. Once the shrimp 2 passes through the mount forks 326, the coil spring 334 urges the upper portion 324a of the mounting members 324 outwardly, causing the mount forks 326 to return to a centered position.

Turning now to FIGS. 26-34, illustrates an alternative example machine 410 having an alternative processing assembly 416. It is appreciated that the machine 10 illustrated in FIGS. 26-34 may include similar features to the machine 10 illustrated in FIGS. 1-25, and accordingly, elements illustrated in FIGS. 26-34 are designated by similar reference numbers indicated in the embodiments illustrated in FIGS. 1-25 increased by multiples of 100. Accordingly, these features will not be described in substantial detail. Further, it is appreciated that any of the elements described with regards to the machine 10 may be incorporated into the machine 10 illustrated in FIGS. 26-34.

In this example, the processing assembly 416 includes a decapitation system 420. With reference to FIGS. 30-34, the decapitation system 420 may include a mounting member 422, a blade assembly 430, and a decapitation drive assembly 450. The mounting member 422 may be in the form of a plate having any number of mounting regions 424 in the form of holes or bores through which a mounting member (not illustrated) such as, for example, a bolt or a screw is inserted to couple the mounting member 422 with the frame assembly 13. As illustrated in FIGS. 26-29, the decapitation system 420 is positioned "downstream" from the individual loading trays 14 such that the shrimp 2 is received by the clamp assembly 30 before arriving at the decapitation system 420. The mounting member 422, and thus the decapitation system 420, may be readily and easily coupled with and/or removed from the shrimp processing machine 10 as desired, and can be readily retrofitted onto existing shrimp processing machines by aligning the mounting regions 424 with the frame assembly 13. The mounting member 422 may be constructed from steel or any other suitable material.

Figure 32:
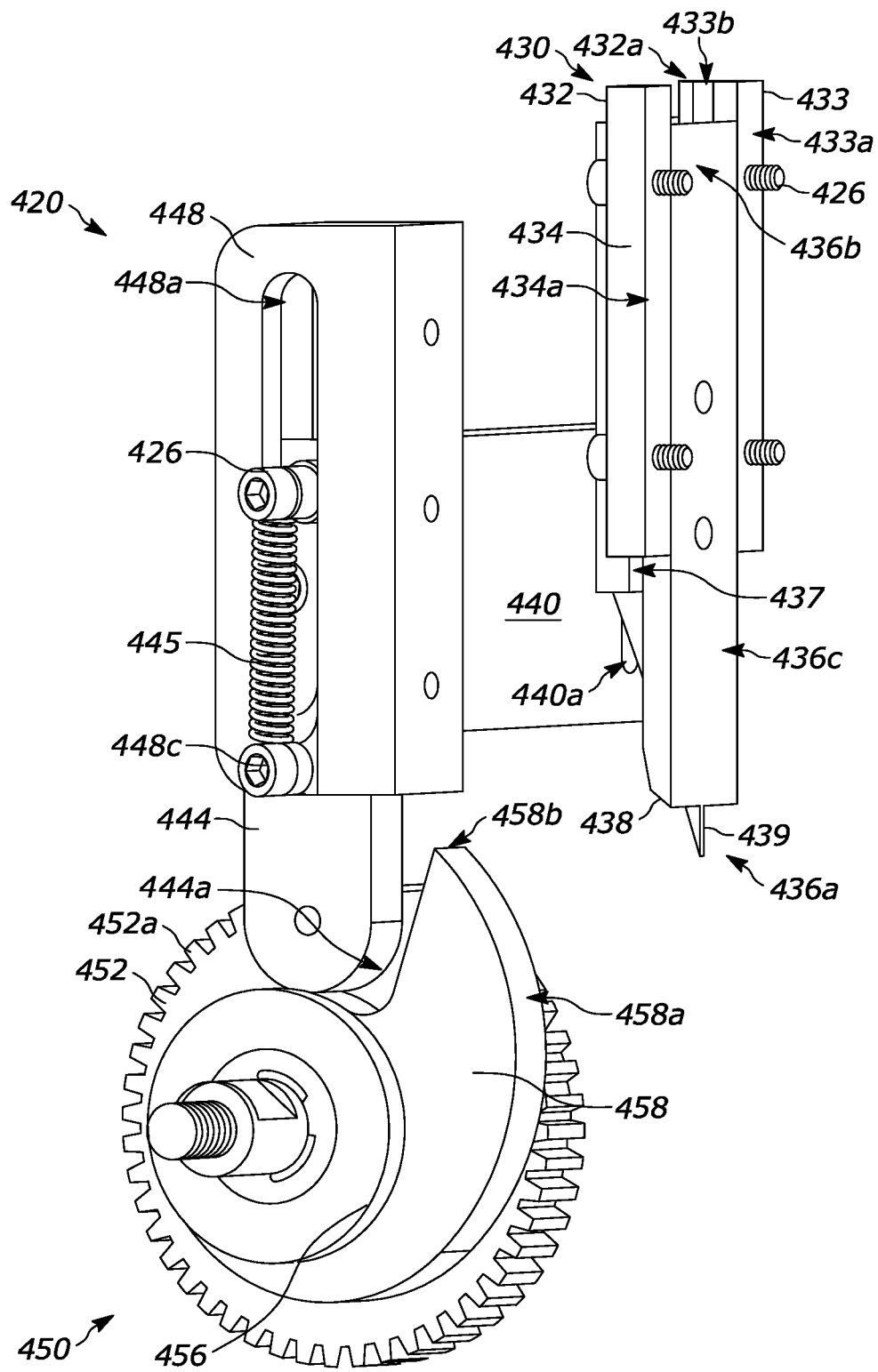
FIG. 32 illustrates a front perspective view of the example decapitation system of FIGS. 30 and 31 having an mounting member removed for clarity in accordance with various embodiments.
Figure 33:
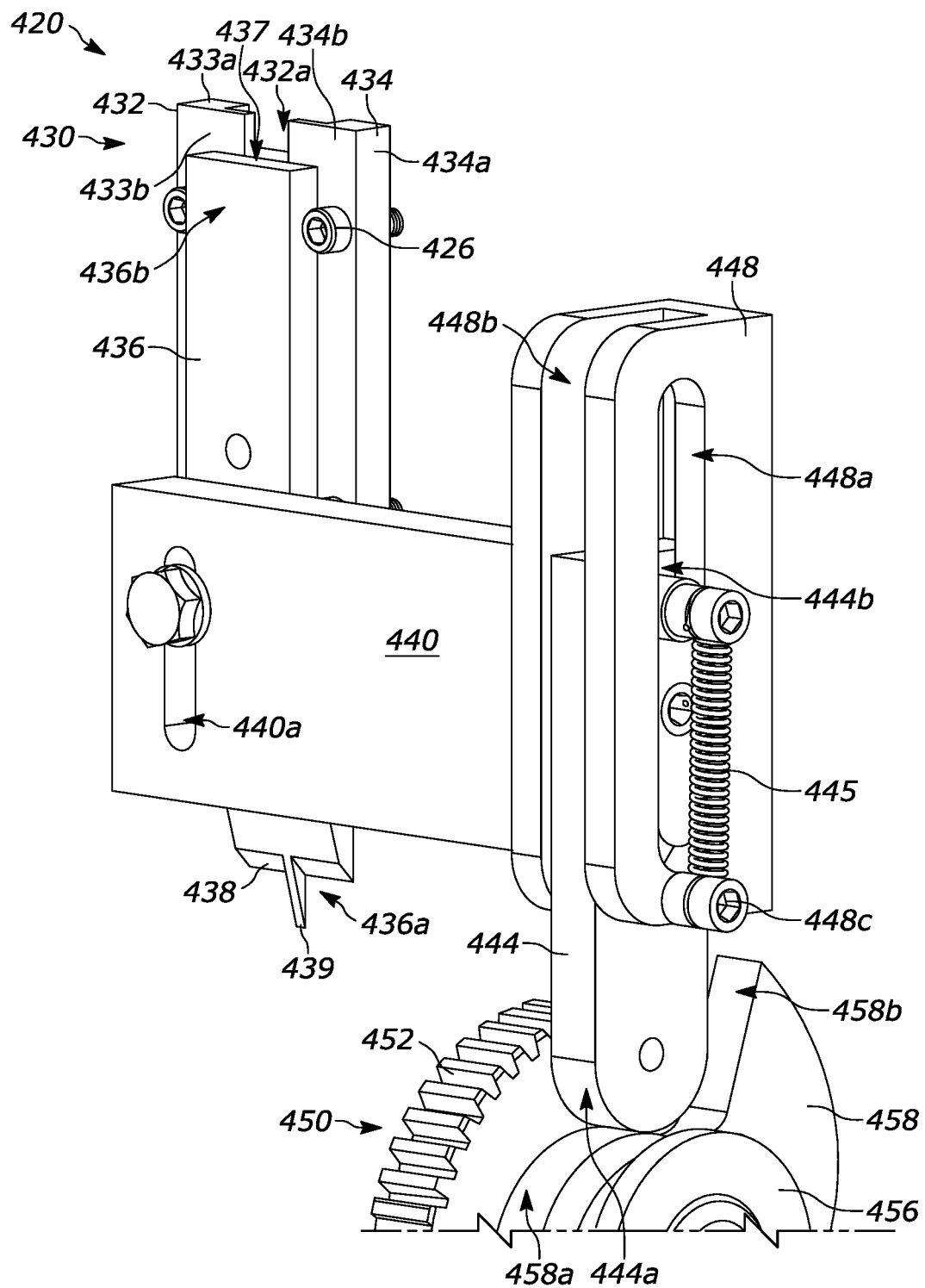
FIG. 33 illustrates a rear perspective view of the example decapitation system of FIGS. 30-32 in accordance with various embodiments.
Figure 34:
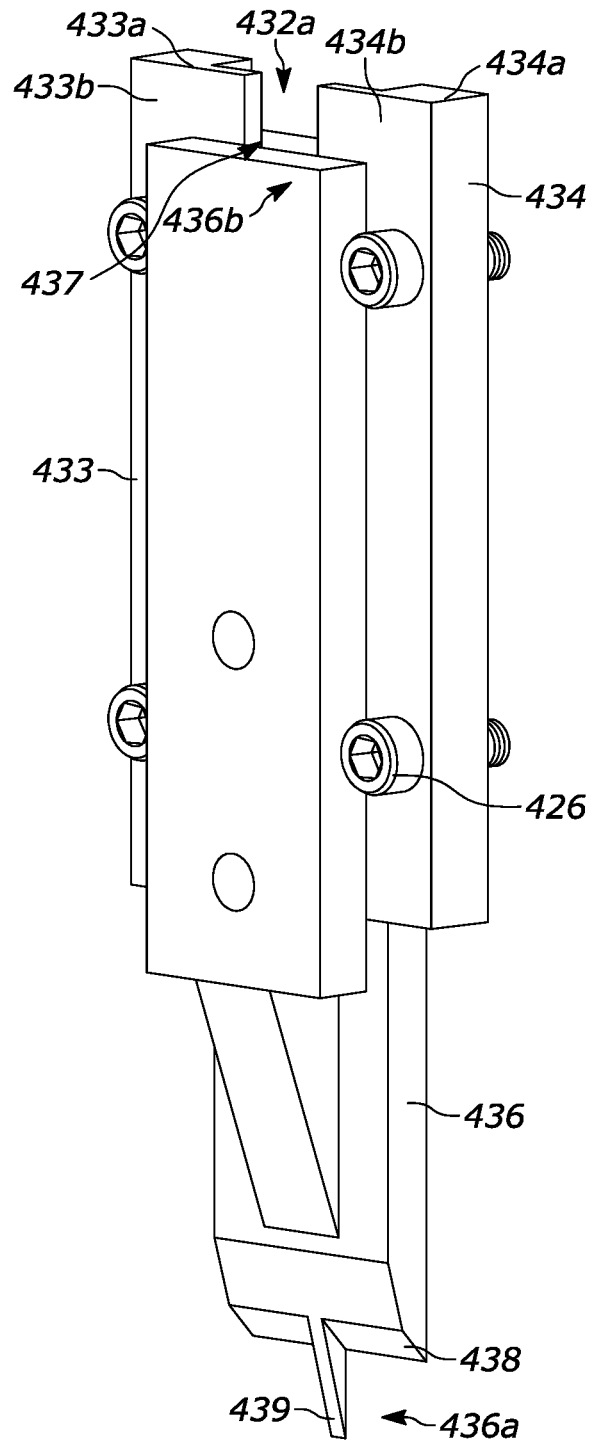
FIG. 34 illustrates a perspective view of the example blade assembly of the example decapitation system of FIGS. 30-33 in accordance with various embodiments of the present disclosure.

The blade assembly 430 includes an elongated track 432, a blade 436, a blade plate 440, and a roller 444. The elongated track 432 includes first and second segments 433, 434 that are positioned a distance from each other such that they form a gap 432a therebetween. Each of the first and second segments 433, 434 are operably coupled with the mounting member 422 via any number of suitable approaches such as, for example, screws or fasteners 426. Each of the first and second segments 433, 434 includes a body portion 433a, 434a and a flange portion 433b, 434b extending therefrom. As illustrated in FIGS. 32-34, the body portions 433a, 434a and the flange portions 433b, 434b cooperate to define a track through which the blade 436 may travel.

The blade 436 is in the form of an elongated member having a first, lower end 436a and a second, upper end 436b. The elongated body of the blade 436 includes a channel 437 extending on each side of the elongated body that receives the first and second flange portions 433b, 434b of the elongated track 432. Further, a rear end 436c of the blade 436 is disposed within the track defined by the body portions 433a, 434a and the flange portions 433b, 434b. Accordingly, the blade 436 may travel from a raised position to a lowered position by traversing the track.

The first end 436a of the blade 436 defines a beveled edge 438 used to cut the shrimp 2. Further, a blade tip 439 may extend from the first end 436a and/or the beveled edge 438. The blade tip 439 may be used to initially pierce the shrimp and to assist in maintaining the shrimp 2 in position for the beveled edge 438 to decapitate the shrimp by separating the shrimp body from the head.

The blade plate 440 of the blade assembly 430 is in the form of an elongated body that operably mounts with the blade 436 via a mounting slot 440a that receives a screw or bolt 426. The blade plate 440 includes a roller coupling portion 441 that receives the roller 444. More specifically, the roller 444 is in the form of an elongated member having a cam engagement portion 444a and a mounting portion 444b in the form of any number of bores or holes through which any number of screws or bolts may be disposed to secure the roller 444 with the blade plate 440. The roller 444 is positioned in a roller side plate 448 that is operably coupled with the mounting member 422. The roller side plate 448 includes at least one side slot 448a and a central slot 448b. More specifically, the at least one side slot 448a allows the screw or bolt to pass through the roller 444 to the blade plate 440. Further, the roller 444 is at least partially disposed within central slot 448b and may travel therein between lowered and raised positions. So configured, because the roller 444 is operably coupled with the blade plate 440, which in turn is operably coupled with the blade 436, translative movement of the roller 444 causes the blade 436 to also translate between upper and lower positions relative to the roller side plate 448 and the mounting member 422. The roller side plate 448 further includes a resilient member mount 448c that receives a resilient member 445. The resilient member 445 operably couples with the resilient member mount 448c on one end and the screw or bolt 426 coupled with the roller 444 on the other end. Accordingly, the resilient member 445, which may be in the form of an extension spring, may bias the roller 444 towards the lowered position relative to the mounting member 422.

The roller 444 movably engages with the decapitation drive assembly 450, which includes a gear 452 and a cam member 456. More specifically, the gear 452 includes gear teeth 452 that engage the main gear 24 which causes the gear 452 to rotate. The cam member 456 is operably coupled with the gear 452 via any number of suitable approaches such as, for example, fasteners or other suitable mechanisms. In some examples, the gear 452 may be integrally formed with the cam member 456. In any event, rotation of the gear 452 additionally causes the cam member 456 to rotate. The cam member 456 includes a helical body 458 that defines an outer cam face 458a which further includes a drop or ledge 458b.

In operation, as the main gear 24 rotates, the shrimp 2, disposed in the loading tray 14, moves towards one of the clamp mechanisms 30, which rotates along with the main gear 24. The clamp mechanism 30 then retains the shrimp 2, and continues to move along the main gear 24. At this time, the cam engagement portion 444a of the roller 444 slidably engages the outer cam face 458a. As the gear 452 rotates via engagement with the main gear 24, the cam member 456 similarly rotates in a clockwise direction (relative to the view illustrated in FIG. 32). The outer cam face 458a urges the cam engagement portion 444a of the roller 444 in an upwards direction, thereby causing the roller 444 to move towards a raised position relative to the roller side plate 448 (and thus the mounting member 422). This also causes the blade plate 440, and the blade 436 coupled therewith, to move towards a raised position relative to the elongated track 432 (and thus the mounting member 422). Accordingly, the blade 436 raises to allow the shrimp 2, carried by the shrimp clamp mechanism 30, to pass under the blade 436. The resilient member 445 elongates as the roller 444 moves upwards relative to the roller side plate 448.

As the cam member 456 continues to rotate, the cam engagement portion 444a of the roller 444 reaches the drop 458b. At this time, the resilient member 445 contacts and urges the roller 444 downwards through the central slot 448b. Further, the blade plate 440, which is coupled with the roller 444, begins to move downwards. Further still, the blade 436, which is coupled with the blade plate 440, begins to move downwards. The first end 436a, and thus the blade tip 439 and the beveled edge 438, penetrates and decapitates the shrimp 430 retained by the shrimp clamp mechanism 430. In some examples, the blade tip 439 may enter into the central opening or groove 440 of the bracket member 400 to ensure the beveled edge 438 of the blade 436 lowers to a sufficient distance to adequately cut the shrimp 2. The cam member 456 continues to rotate, which causes the blade 436 to raise from the lowed position to prepare to cut another shrimp.

In some examples, the timing of the decapitation system 420 may be adjusted by moving the blade 436 within the mounting slot 440a of the blade plate 440 which may additionally be used to accommodate shrimp 2 of different sizes. In some examples, the beveled edge 438 of the blade 436 may be configured to form an angle between approximately 30° and approximately 40°, and in some embodiments, approximately 36° relative to the face of the shrimp clamping mechanism 30 when in the lowered position. Other examples of suitable angles are possible. Further, in some examples, different resilient members 445 may be used to adjust the speed in which the blade 436 is urged to the lowered position in order to ensure the shrimp is completely decapitated.

As previously noted, after the shrimp 2 is retained by the clamp mechanism 30, any additional processing such as breaking the tail, cutting, deveining, and/or cleaning may occur. For example, the tail breaker assembly 81 may reengage the shrimp 2 to break and separate the tail shell from the shell of the body of the shrimp 2. These additional processes may occur at any point during processing of the shrimp 2.

In accordance with the foregoing, a unique shrimp processing machine is efficiently adjustable to accommodate removal of the head from the body of the shrimp, cutting, cleaning, and removing of shrimp meat of shrimp having different sizes. The adjustable nature of the machine can reduce processing times by requiring minimal effort to adjust the machine in a desired manner. Further, the decapitation system may advantageously and readily be mounted to an existing shrimp processing machine by securing the decapitation system to the frame of the machine and aligning the gear with the main gear. As such, any number of existing shrimp processing machines may be upgraded with decapitation capabilities.

In accordance with the foregoing, a unique shrimp processing machine is efficiently adjustable to accommodate cutting, cleaning, and removing of shrimp meat of shrimp having different sizes. The adjustable nature of the machine can reduce processing times by requiring minimal effort to adjust the machine in a desired manner.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A shrimp processing machine for processing shrimp having a shrimp body and a shrimp head, the shrimp processing machine including:
   a frame assembly; and
   a processing assembly operably coupled with the frame assembly, the processing assembly including:
      a drive assembly operably coupled with the frame assembly;
      a clamp mechanism adapted to retain the shrimp, and
      a decapitation system adapted to separate the shrimp body from the shrimp head, the decapitation system including a meat picking member being movable relative to the clamp mechanism, the meat picking member adapted to travel along a path to pierce the shrimp body and separate the shrimp body from the shrimp head.

2. The shrimp processing machine of claim 1, wherein the processing assembly further includes a bracket member operably coupled with the drive assembly, the bracket member including a shrimp support surface adapted to at least partially support at least one of the shrimp body or the shrimp head.

3. The shrimp processing machine of claim 2, wherein the bracket member includes a recessed region to accommodate a portion of the shrimp head.

4. The shrimp processing machine of claim 2, wherein the clamp mechanism is operably coupled with the bracket member, the clamp mechanism including at least one clamp pin adapted to engage at least one of the shrimp body or the shrimp head.

5. The shrimp processing machine of claim 4, wherein the clamp mechanism is adapted to retain the shrimp head upon the meat picking member piercing the shrimp body, thereby separating the shrimp body from the shrimp head upon continued movement of the meat picking member.

6. The shrimp processing machine of claim 1, wherein the meat picking member is mounted to an oscillating arm operably coupled with the drive assembly.

7. The shrimp processing machine of claim 6, wherein the meat picking member includes a picker arm having a piercing portion and a sliding portion, wherein the sliding portion of the picker arm is adapted to slidably engage the shrimp and the piercing portion of the picker arm is adapted to pierce the shrimp.

8. A shrimp processing machine for processing shrimp having a shrimp body and a shrimp head, the shrimp processing machine including:
a frame assembly; and
a processing assembly operably coupled with the frame assembly, the processing assembly including:
a drive assembly operably coupled with the frame assembly;
a clamp mechanism adapted to retain the shrimp,
a decapitation system adapted to separate the shrimp body from the shrimp head, and
an adjustable positioning roller assembly including a roller arm and a roller body, the adjustable positioning roller assembly adapted to exert an urging force on the shrimp to position the shrimp on the bracket member.

9. A shrimp processing machine for processing shrimp having a shrimp body and a shrimp head, the shrimp processing machine including:
a frame assembly; and
a processing assembly operably coupled with the frame assembly, the processing assembly including:
a drive assembly operably coupled with the frame assembly;
a clamp mechanism adapted to retain the shrimp,
a decapitation system adapted to separate the shrimp body from the shrimp head, and
an adjustable guide member adapted to align the shrimp relative to the processing assembly.

10. The shrimp processing machine of claim 9, wherein the adjustable guide member includes a first guide member body having a first guide fork extending therefrom and a second guide member body having a second guide fork extending therefrom, the first guide member body being operably coupled with the second guide member body, wherein the first and second guide forks are configured to center the shrimp on the bracket member.

11. The shrimp processing machine of claim 9, wherein the adjustable guide member includes:
a strut operably coupled with the frame assembly;
a mounting shaft operably coupled with the strut;
a first mount disk being movably coupled with the mounting shaft; and
a second mount disk being movably coupled with the mounting shaft;
wherein the first and second mount disks are configured to center the shrimp on the bracket member.

12. A shrimp processing machine for processing shrimp having a shrimp body and a shrimp head, the shrimp processing machine including:
a frame assembly; and
a processing assembly operably coupled with the frame assembly, the processing assembly including:
a drive assembly operably coupled with the frame assembly;
a clamp mechanism adapted to retain the shrimp,
a decapitation system adapted to separate the shrimp body from the shrimp head, wherein the decapitation system includes:
a mounting member;
a blade assembly movably coupled with the mounting member, the blade assembly including a blade being movable between a raised position and a lowered position; and
a decapitation drive assembly operably coupled with the blade assembly, the decapitation drive assembly including a gear and a cam member operably coupled with the gear, the gear adapted to engage a main gear of the shrimp processing machine;
wherein the cam member is movably coupled with a portion of the blade assembly to urge the blade between the raised and lowered positions.

13. A decapitation system for a shrimp processing machine, the decapitation system including:
a mounting member;
a blade assembly movably coupled with the mounting member, the blade assembly including a blade being movable between a raised position and a lowered position; and
a decapitation drive assembly operably coupled with the blade assembly, the decapitation drive assembly including a gear and a cam member operably coupled with the gear, the gear adapted to engage a main gear of the shrimp processing machine;
wherein the cam member is movably coupled with a portion of the blade assembly to urge the blade between the raised and lowered positions.

14. The decapitation system of claim 13, wherein the blade assembly includes an elongated track operably coupled with the mounting member, wherein the blade is movable within the track.

15. The decapitation system of claim 14, wherein the blade assembly further includes a roller operably coupled with the blade, the roller including a cam engagement portion adapted to engage the cam member.

16. The decapitation system of claim 15, wherein the cam member includes a helical body defining a cam face adapted to engage the cam engagement portion of the roller.

17. The decapitation system of claim 13, wherein the blade assembly includes a resilient member adapted to bias the blade towards the lowered position.

18. The decapitation system of claim 13, wherein the blade includes an elongated member having a first end and a second end, the first end including a beveled surface.

19. The decapitation system of claim 18, wherein the first end of the blade further includes a blade tip extending from the beveled surface.

20. The decapitation system of claim 13, wherein the mounting member includes a mounting plate having at least one mounting region to secure with a frame assembly of the shrimp processing machine.

* * * * *